United States Patent
Ewing et al.

(10) Patent No.: US 11,796,664 B2
(45) Date of Patent: Oct. 24, 2023

(54) ROBUST FEEDBACK DESIGN METHODOLOGY FOR TRANSFORM SENSING USING RADIO FREQUENCY (RF) PHASE ARRAY DETECTION

(71) Applicant: US Gov't as represented by Secretary of Air Force, Wright-Patterson AFB, OH (US)

(72) Inventors: Robert Ewing, Kettering, OH (US); Yuan Zheng, Columbus, OH (US); Siyang Cao, Tucson, AZ (US); David Brendel, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 80 days.

(21) Appl. No.: 17/137,478

(22) Filed: Dec. 30, 2020

(65) Prior Publication Data
US 2021/0208268 A1 Jul. 8, 2021

Related U.S. Application Data

(60) Provisional application No. 63/131,348, filed on Dec. 29, 2020, provisional application No. 63/086,612, (Continued)

(51) Int. Cl.
*G01S 13/42* (2006.01)
*G01S 7/28* (2006.01)
(Continued)

(52) U.S. Cl.
CPC .......... *G01S 13/426* (2013.01); *G01S 7/2813* (2013.01); *H01Q 3/36* (2013.01); *G01S 2013/0245* (2013.01)

(58) Field of Classification Search
None
See application file for complete search history.

(56) References Cited

U.S. PATENT DOCUMENTS

| 2,678,997 A | 5/1954 | Darlington | |
|---|---|---|---|
| 2021/0003694 A1* | 1/2021 | Sick | G01S 13/931 |

OTHER PUBLICATIONS

WO2019170797 translation (Year: 2019).*
(Continued)

*Primary Examiner* — Whitney Moore
(74) *Attorney, Agent, or Firm* — AFMCLO/JAZ; Timothy M. Barlow

(57) ABSTRACT

The present disclosure addresses a novel feedback design methodology to meet the emerging frontiers of beamforming radio frequency (RF) technology in the areas of machine learning and surveillance. The feasibility of developing adaptive waveform modulation schemes for spectrum management in radars via orthogonal wavelet concepts. With the increasing prevalence of RF spectrum bandwidth limitations, this approach of adaptive feedback waveforms addresses advanced signal processing beamforming technique for phase array RF improving overall sensing performance. The adaptive illumination waveform algorithms for enhancing detection, discrimination, and tracking is motivated from the analogy drawn between the cellular wireless communication systems and the general multi-static radar automotive systems. The present innovation has developed signal processing schemes of adaptive illumination waveforms for enhancing RF detection performance and have developed a unified system architecture of the adaptive radar waveform design for various scenarios including multi-static radars and multiple targets.

5 Claims, 30 Drawing Sheets
(28 of 30 Drawing Sheet(s) Filed in Color)

Related U.S. Application Data filed on Oct. 2, 2020, provisional application No. 62/956,393, filed on Jan. 2, 2020.

(51) Int. Cl.
*H01Q 3/36* (2006.01)
*G01S 13/02* (2006.01)

(56) References Cited

OTHER PUBLICATIONS

Frank et al., "Polyphase codes with good nonperiodic correlation properties," IEEE Trans. Information Theory, vol. 9 (1963) 43-45.
Bonneau, "A wavelet packet basis optimization approach to radar waveform design," Proc. IEEE Intl. Symp Xnteannas Prop. (2001) 814-816.
Benedetto et al., "Ambiguity function and frame-theoretic properties of periodic zero-autocorrelation waveforms," IEEE J. Select Topics Signal Proc., vol. 1 (2007) 6-16.
Costas, "A study of a class of detection waveforms having nearly ideal range-Doppler ambiguity properties," Proc. IEEE, vol. 72 (1984) 996-1009.
Harris, "One the use of windows for harmonic analysis with the discrete Fourier transform," Proc. IEEE, vol. 66 (1978) 51-83.
Cao et al., "Wavelet-based waveform for effective sidelobe suppression in radar signal," IEEE Trans. Aero. Electr. Syst., vol. 50 (2014) 265-284.
Cao et al., "A wavelet packet based radar waveform for high resolution in range and velocity detection," IEEE Trans. Geosc. Remote Sens., vol. 53 (2015) 229-243.
"20.13 Biphase Codes," In Principles of Modern Radar. Ed. Richards et al. (2010) SciTech Publishing Inc. 817-832.

* cited by examiner

Figure 1 Wavelet coefficient generation processes for different types of wavelets.

(a) $f_{\omega 2}(n)$ (b) $f_{\psi 2}(n)$ (e) $f_{\varphi 2}(n)+f_{\psi 2}(n)+f_{\psi 1}(n)$

ROBUST FEEDBACK DESIGN METHODOLOGY FOR TRANSFORM SENSING USING RADIO FREQUENCY (RF) PHASE ARRAY DETECTION

CROSS-REFERENCE TO RELATED APPLICATIONS

This application claims the benefit of priority under 35 U.S.C. § 119(e) to U.S. Provisional Application Ser. No. 63/131,348 entitled "Robust Feedback Design Methodology for Transform Sensing Using Radio Frequency (RF) Phase Array Detection," filed 29 Dec. 2020, the contents of which are incorporated herein by reference in their entirety.

This application claims the benefit of priority under 35 U.S.C. § 119(e) to U.S. Provisional Application Ser. No. 63/086,612 entitled "Robust Feedback Design Methodology for Transform Sensing Using Radio Frequency (RF) Phase Array Detection," filed 2 Oct. 2020, the contents of which are incorporated herein by reference in their entirety.

This application claims the benefit of priority under 35 U.S.C. § 119(e) to U.S. Provisional Application Ser. No. 62/956,393 entitled "Robust Feedback Design Methodology for Transform Sensing Using RF Phase Array Detection," filed 2 Jan. 2020, the contents of which are incorporated herein by reference in their entirety.

RIGHTS OF THE GOVERNMENT

The invention described herein was made by employees of the United States Government and may be manufactured and used by or for the Government of the United States of America for governmental purposes without the payment of any royalties thereon or therefore.

BACKGROUND

Due to its rapid and inertialess scanning, the phased array radar is replacing the traditional mechanical scanning radar these years [1]. As the number of the array elements increases, phased array can generate an extremely narrow beam. Though the narrower beam ensures high angle resolution, it still takes a long time to cover a wide looking angle via electronically steering the narrow beam. To overcome this shortcoming, digital beam forming technique [2] generates the omnidirectional beam in the space, and simultaneously shapes multiple virtual narrow beams in different angles after post-processing the received signals from different receiver elements. However, digital beam forming itself does not change the actual transmission beam pattern in desired looking angles, and thus cannot distribute transmission power in the space. The multiple-input multiple-output (MIMO) radar system [3] is another technique proposed to virtually shape narrow beam for estimating the direction of arrival (DOA) of target. It assumes that the transmitted signal associated with each transmit element can be identified in the receiver's post processing. Consequently, the MIMO radar can virtually generate a large array aperture, which increases the number of resolvable targets using a less number of array elements. However it is impossible to generate a totally orthogonal waveform set for transmitters. Only discrete-orthogonal waveform or time division waveform [4] is applied. The increment of angle resolution comes at the price of losing coherent processing gain at the transceiver side, which on the other hand, is a major advantage of phased array. The above techniques focus on sensing or recovering the spatial information pixel by pixel, and the beam pattern is fixed. To generate different desired array patterns, Steyskal [5] has studied the method of synthesizing antenna patterns with prescribed nulls at a given set of angels. He further applied the Fourier transform on wideband circular arrays to synthesize beam patterns [6]. It shows that Fast Fourier Transform (FFT) can lower the calculation complexity for digital beamforming.

SUMMARY

A sensing feedback mechanism called transform sensing for phased array as well as MIMO systems using wavelets. By this new approach, the array will form beams in parallel, which constitute a wavelet transformation, and the space is sensed in the transformed domain. Consequently, sensing can cover a wider area at a high speed, and critical areas can still be closely observed. The new approach can reduce the volume of collect data by one order of magnitude, while the high resolution is still gained by the increased number of elements. In this patent, we present a new sensing feedback mechanism, named transform sensing, for the phased array or the MIMO system to generate multiple beam patterns in the space. Taking the multi-resolution advantage in the spatial-frequency of the wavelets, transform sensing can generate multiple beam patterns using wavelet bases. Consequently, each sensing result is equivalent to a wavelet transform coefficient. There are a large number of null coefficients when applying wavelet transform to an image. The Transform sensing applied to phased array does not need to deploy all the wavelet sensing patterns to the space. It generates coarse to detailed patterns to sense a targeted area. The coarse sensing patterns (i.e. wide beam pattern) are firstly applied to cover a wide area using less sensing times. After thresholding the coarse sensing results, the radar system can automatically determine which new sensing pattern is necessary for the next detailed level scanning. In this way, the transform sensing radar system can eliminate redundant sensing, and thus improving sensing efficiency. The patent or application file contains at least one drawing executed in color. Copies of this patent or patent application publication with color drawing(s) will be provided by the Office upon request and payment of the necessary fee.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
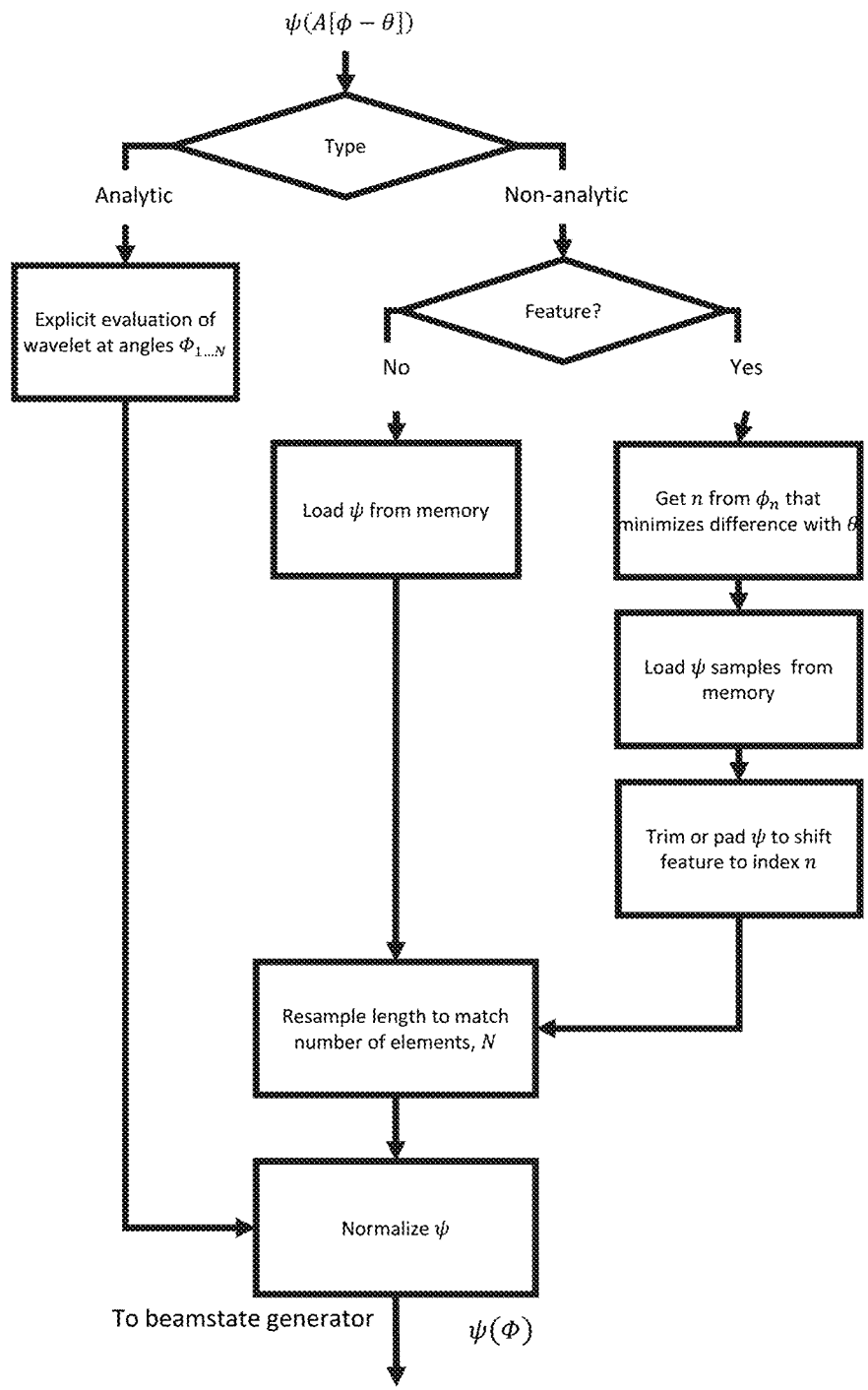

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

FIG. 1 presents wavelet coefficient generation processes for different types of wavelets.

Figure 2:
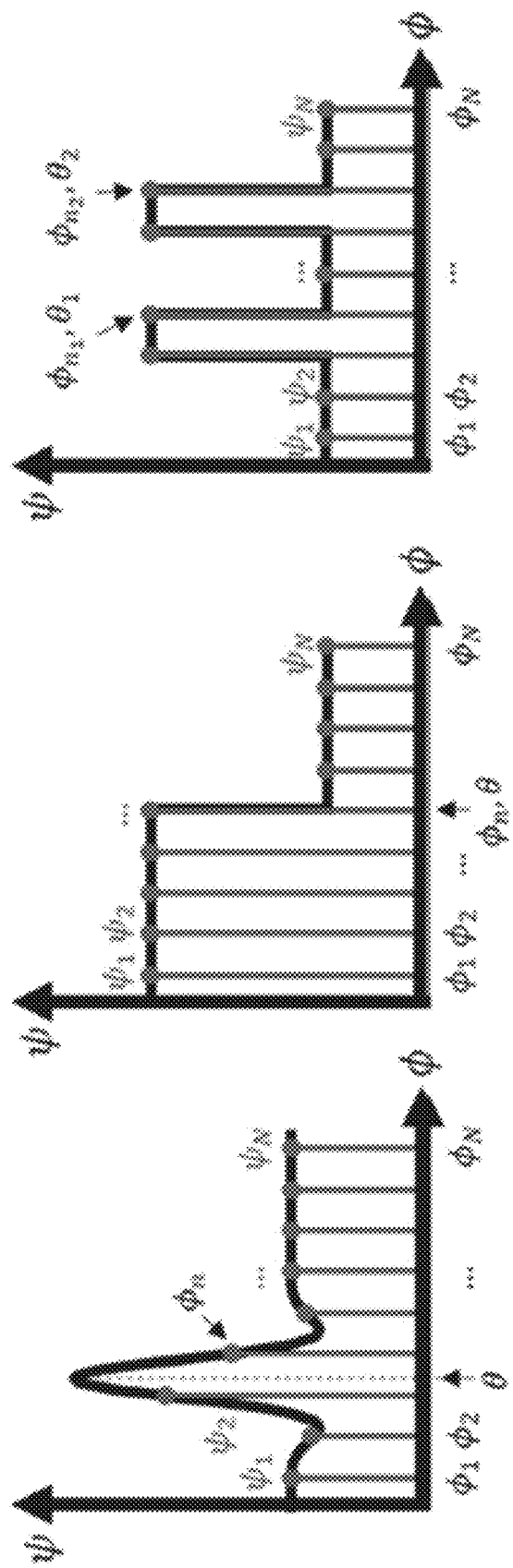

FIGS. 2A-2C present examples of wavelet coefficient sampling for several wavelets: 2A) Analytic, Mexican Hat; and 2B) non-analytic Haar; and 2C) concurrent Haars.

Figure 3:
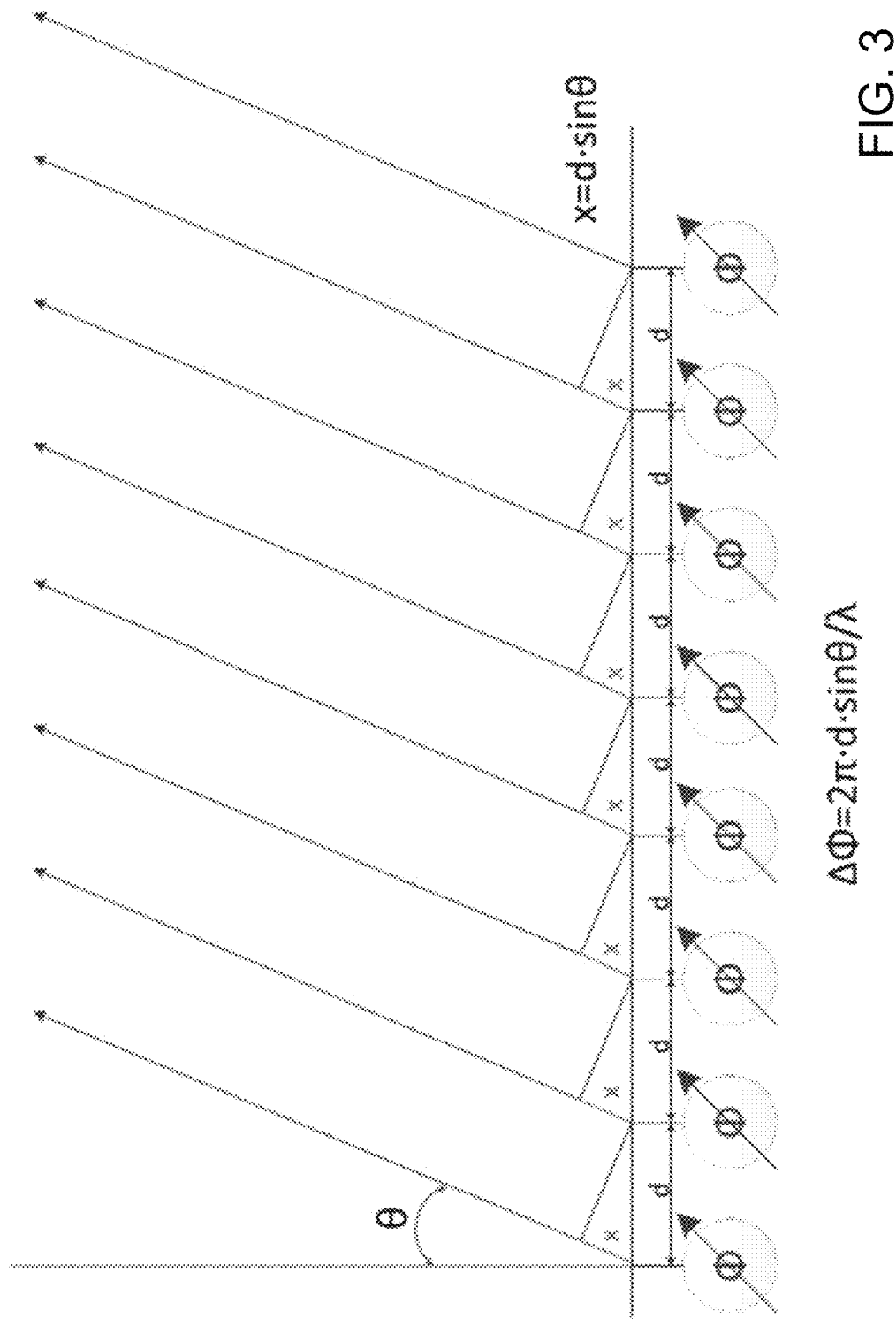

FIG. 3 illustrates a phased array.

Figure 4:
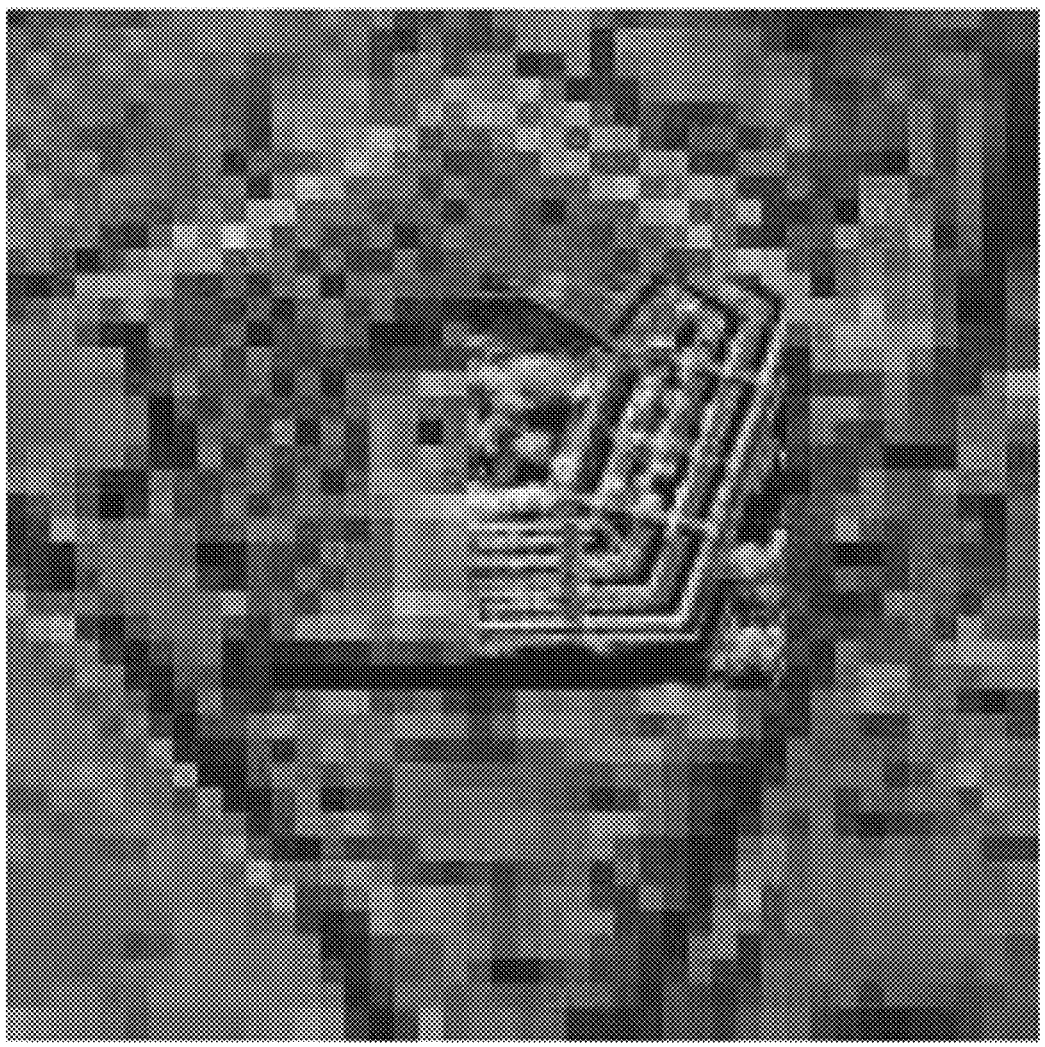

FIG. 4 presents that transform sensing generates adaptive resolutions for a target area (note different resolutions in the figure).

Figure 5:
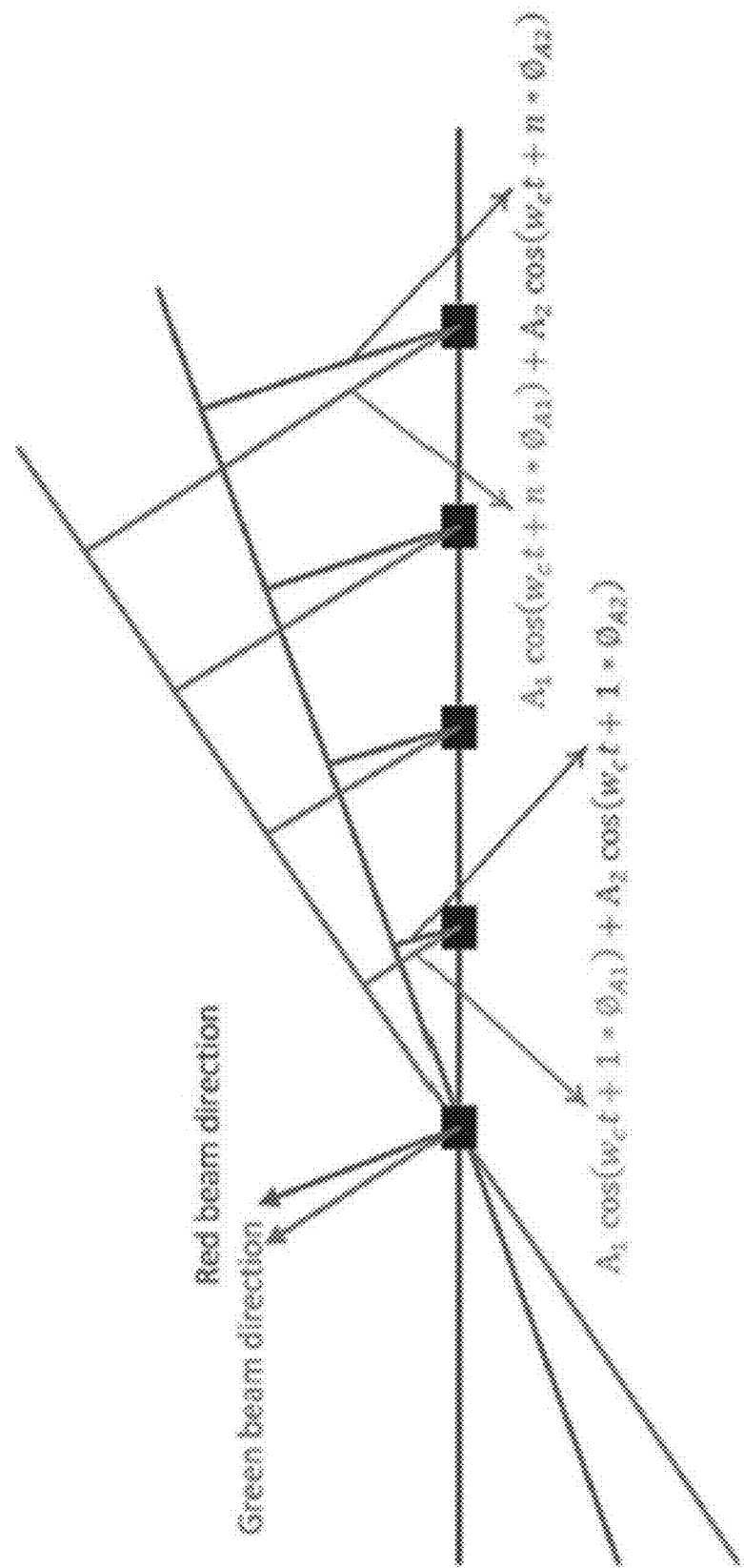

FIG. 5 illustrates that the phased array forms beams in multiple directions simultaneously.

Figure 6:
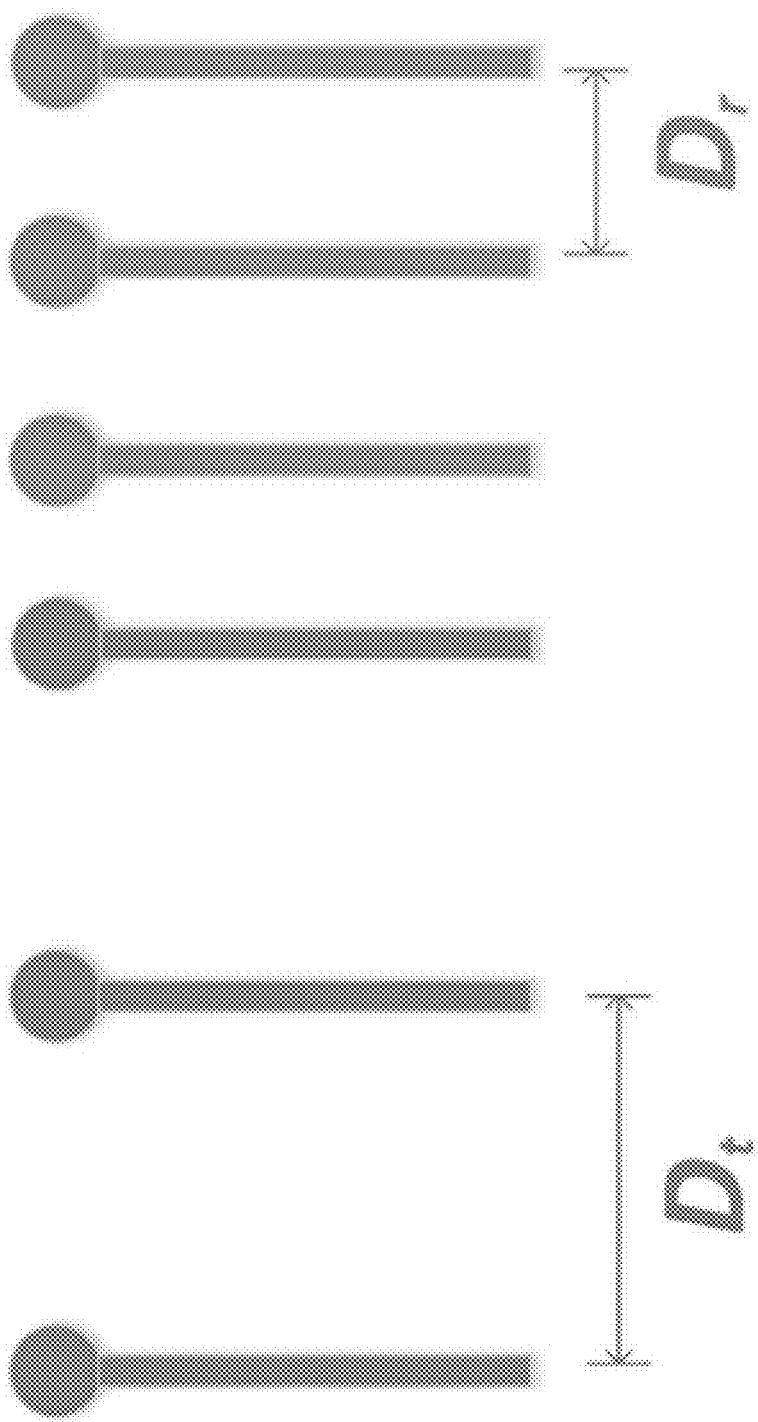

FIG. 6 illustrates MIMO antenna transmitter and receiver elements; the transmitter elements are separated by D and the receiver elements are separated by Dr.

Figure 7A:
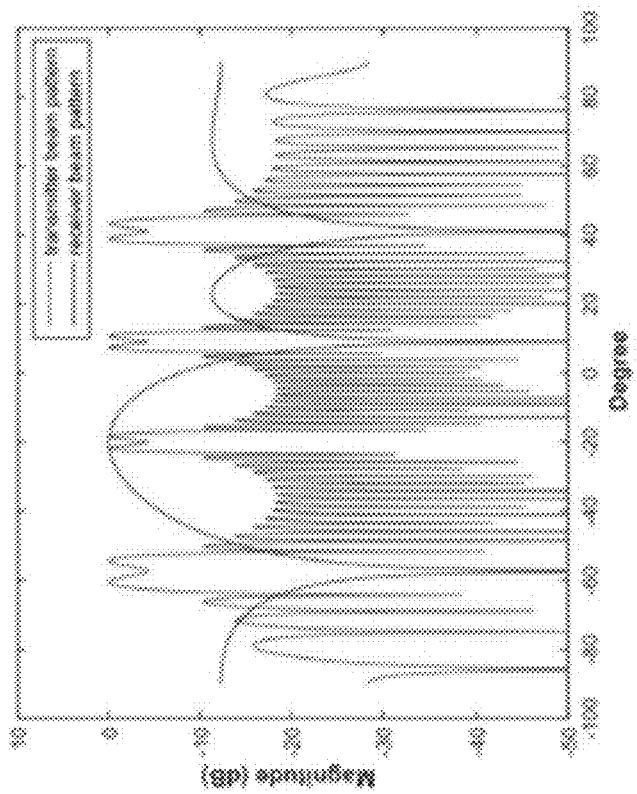
Figure 7B:
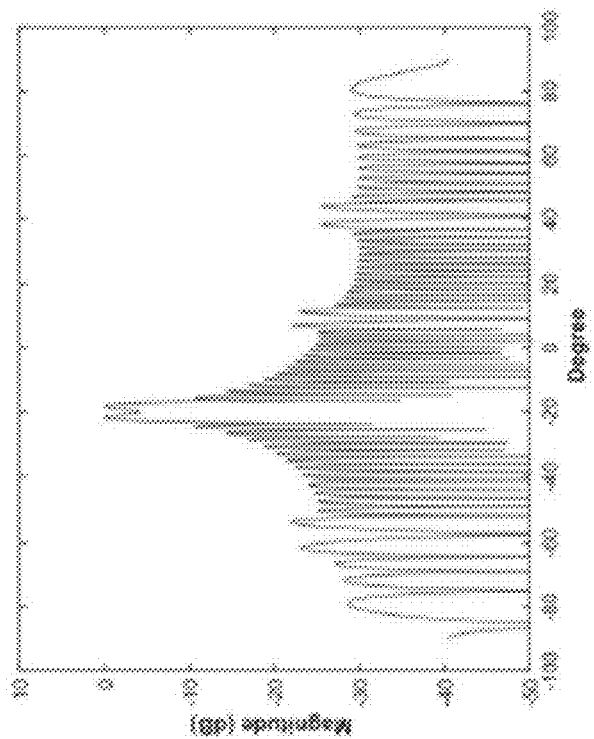

FIGS. 7A-7B illustrate MIMO radar transmitter and receiver patterns; FIG. 7A illustrates separate beam patterns of transmitter and receiver, and FIG. 7B illustrates combined beam patterns of transmitter and receiver.

Figure 8A:
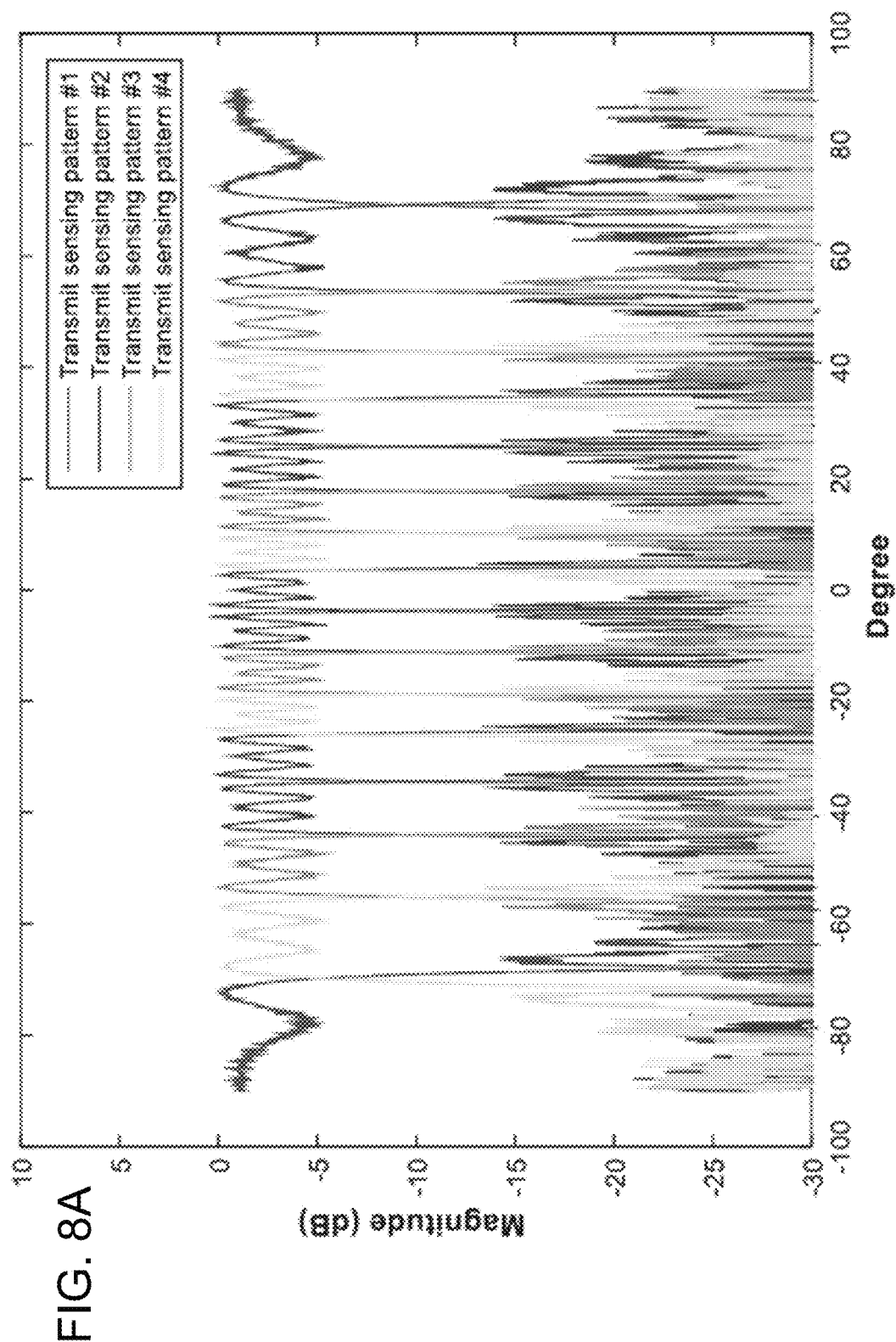
Figure 8B:
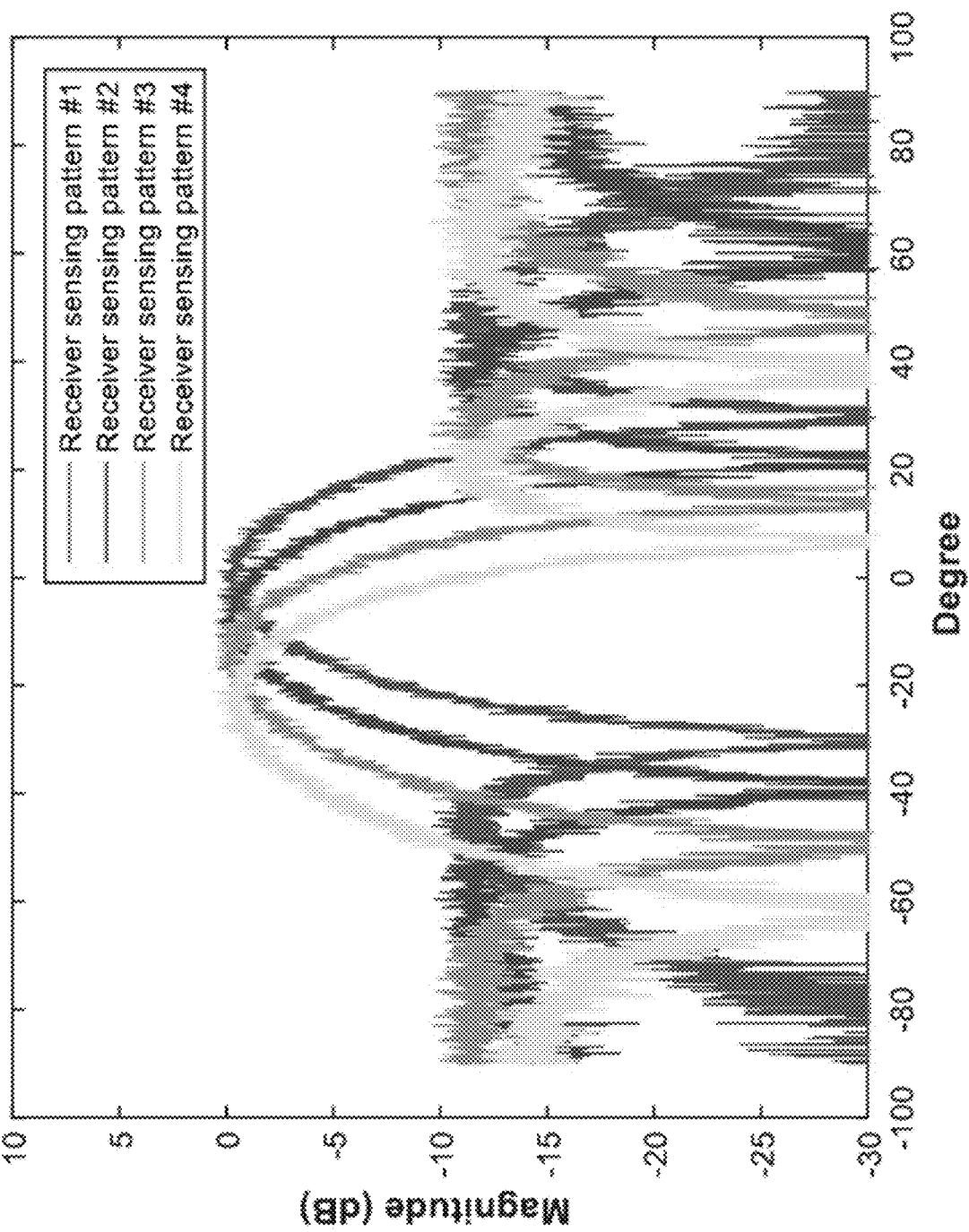
Figure 8C:
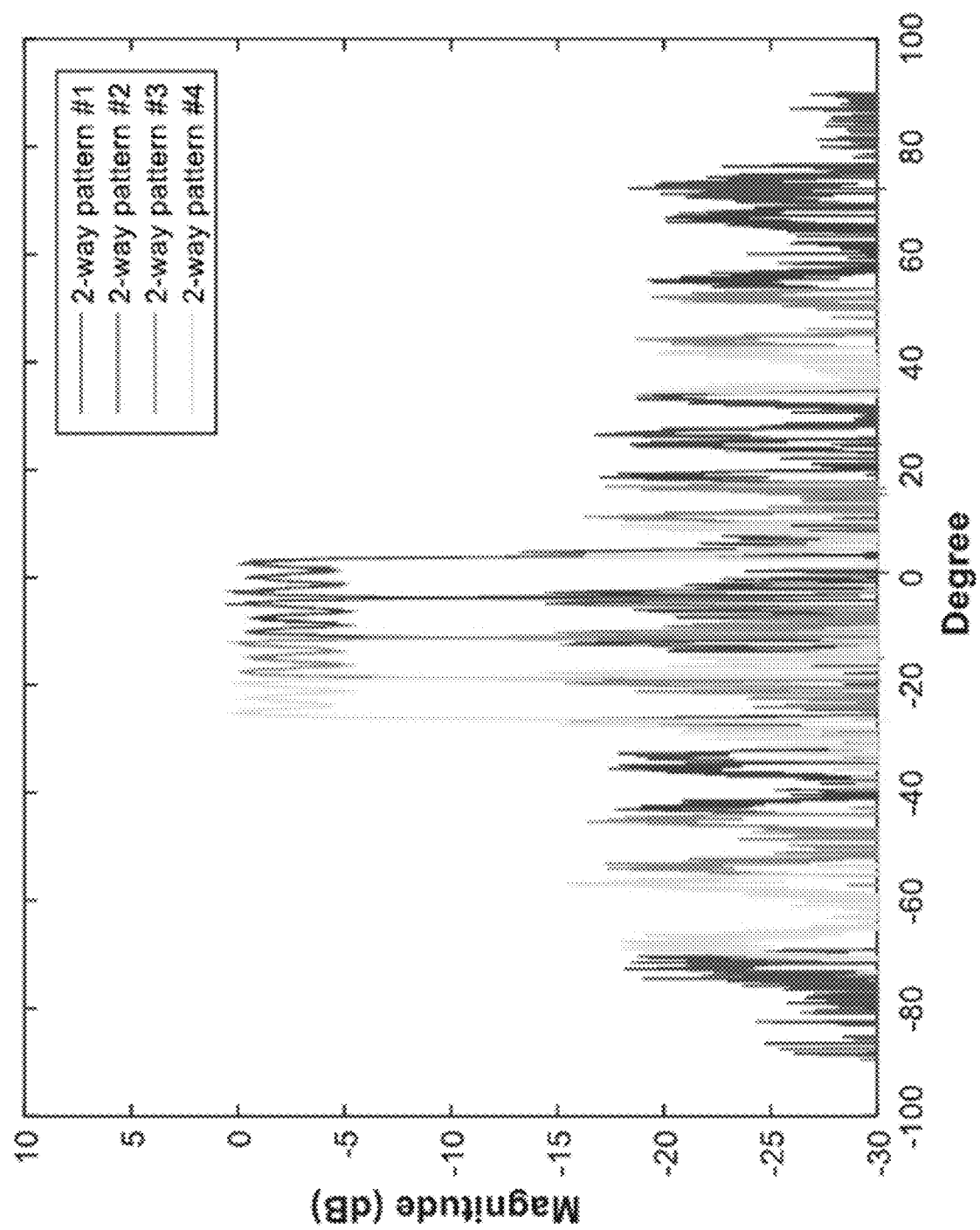

FIGS. 8A-8C illustrate generated scaling function beam patterns; 8A are different transmitter beam patterns; 8B are different receiver beam patterns; and 8C is a different combined beam pattern.

FIGS. 9A-9E illustrate generated scaling function beam patterns.

Figure 10:
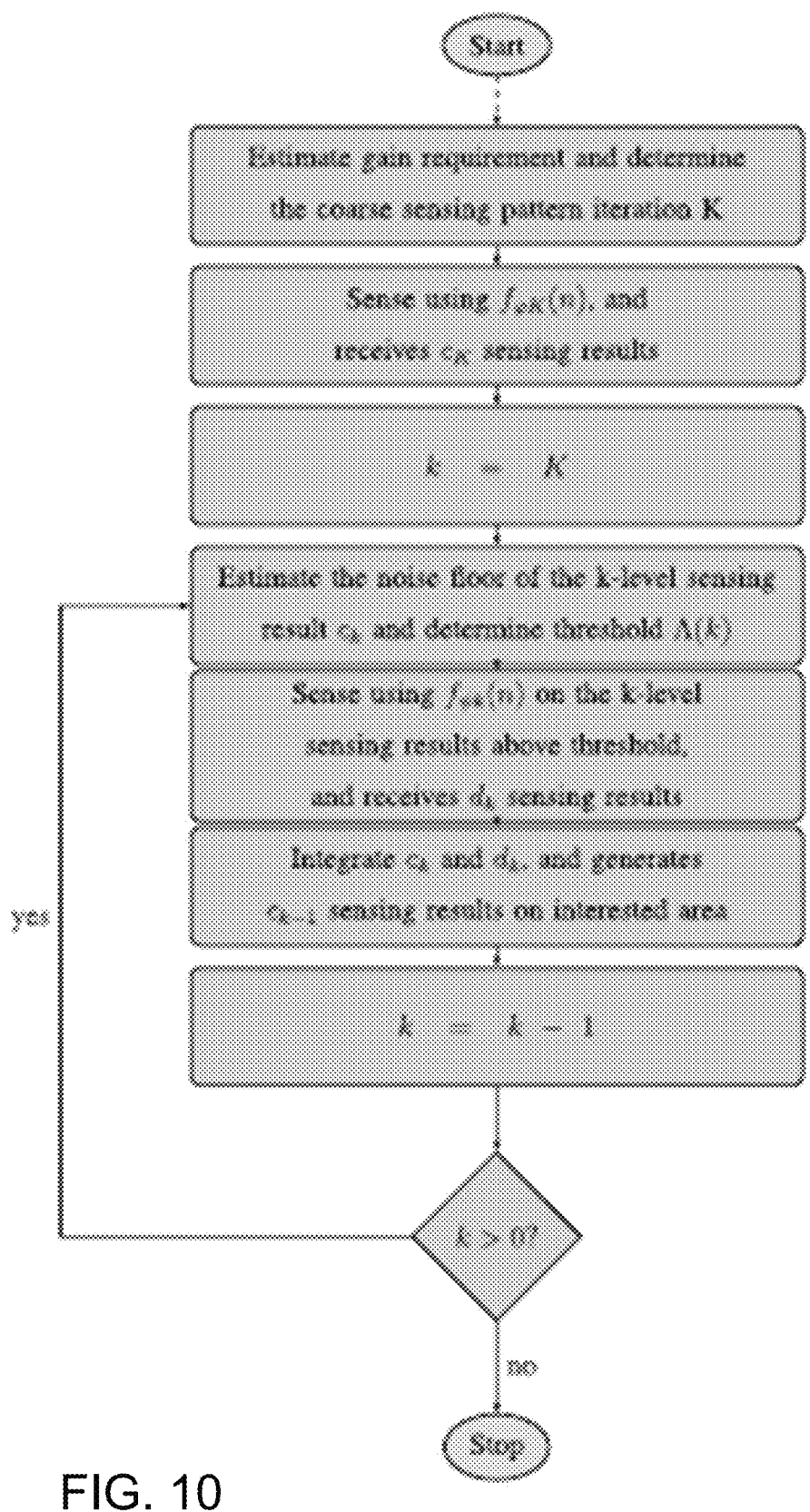

FIG. 10 illustrates the pseudo-code of transform sensing.

Figure 11:
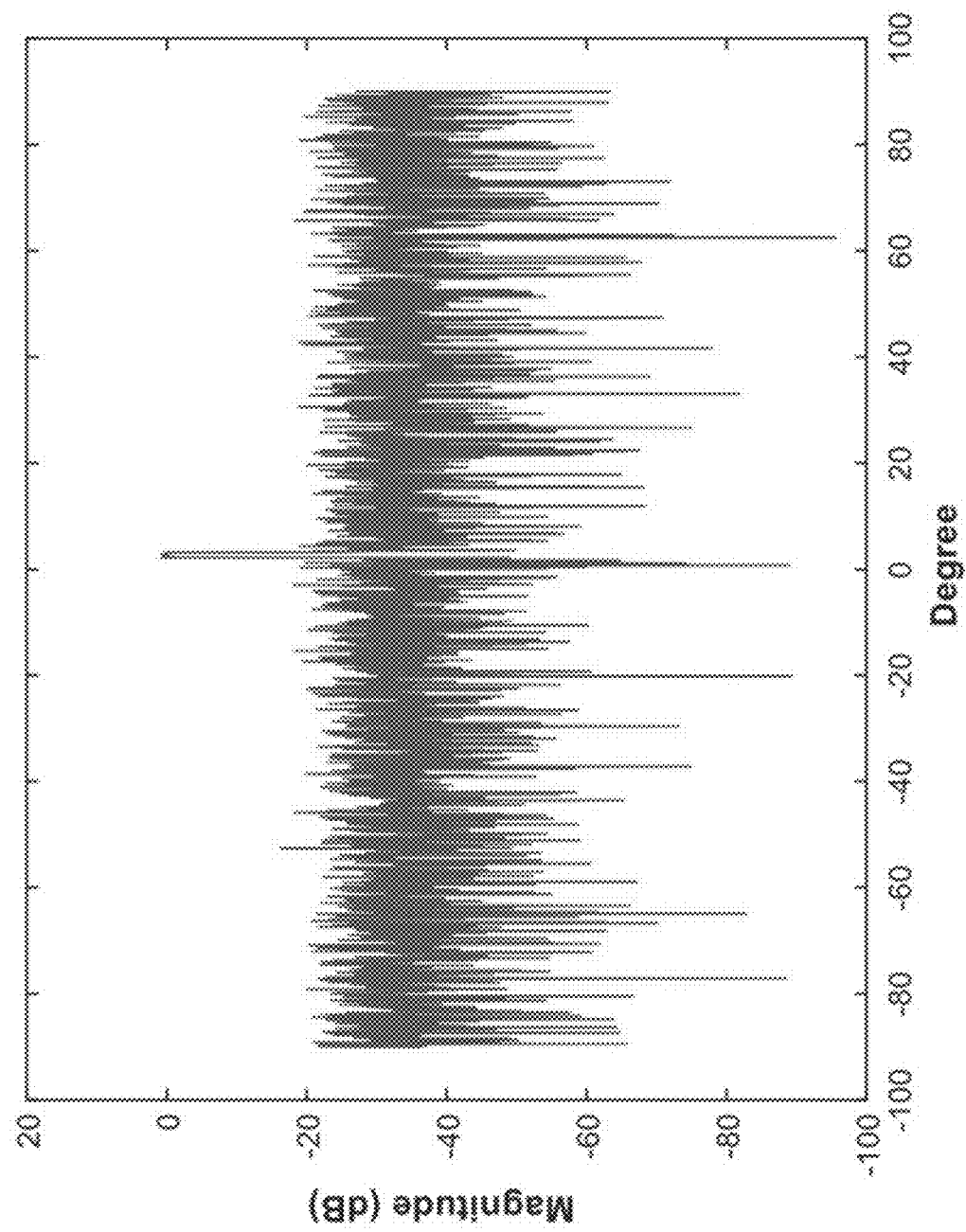

FIG. 11 illustrates a condition wherein a single target is present in the scene.

Figure 12:
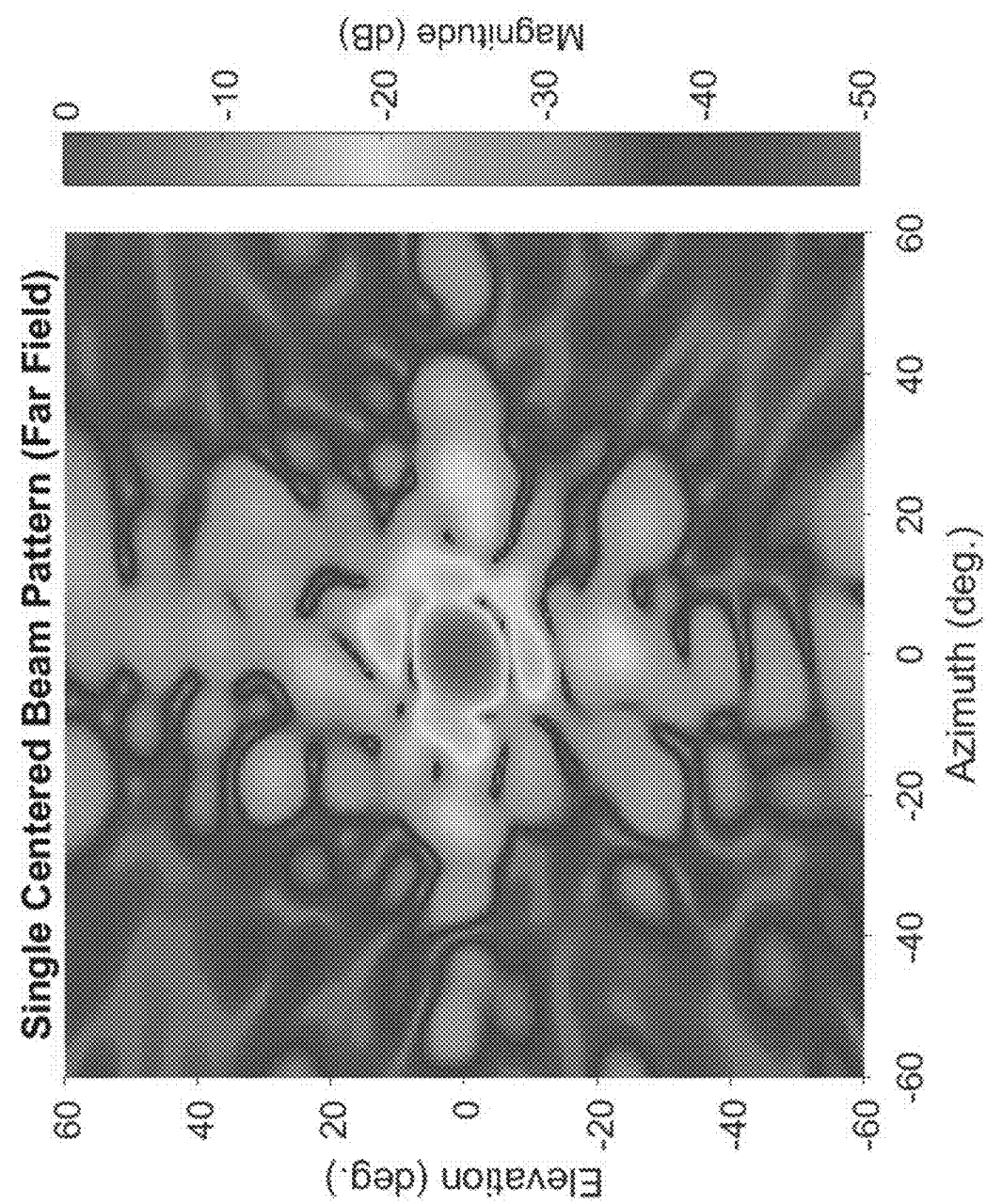

FIG. 12 illustrates far-field wave patterns of the array radar.

Figure 13:
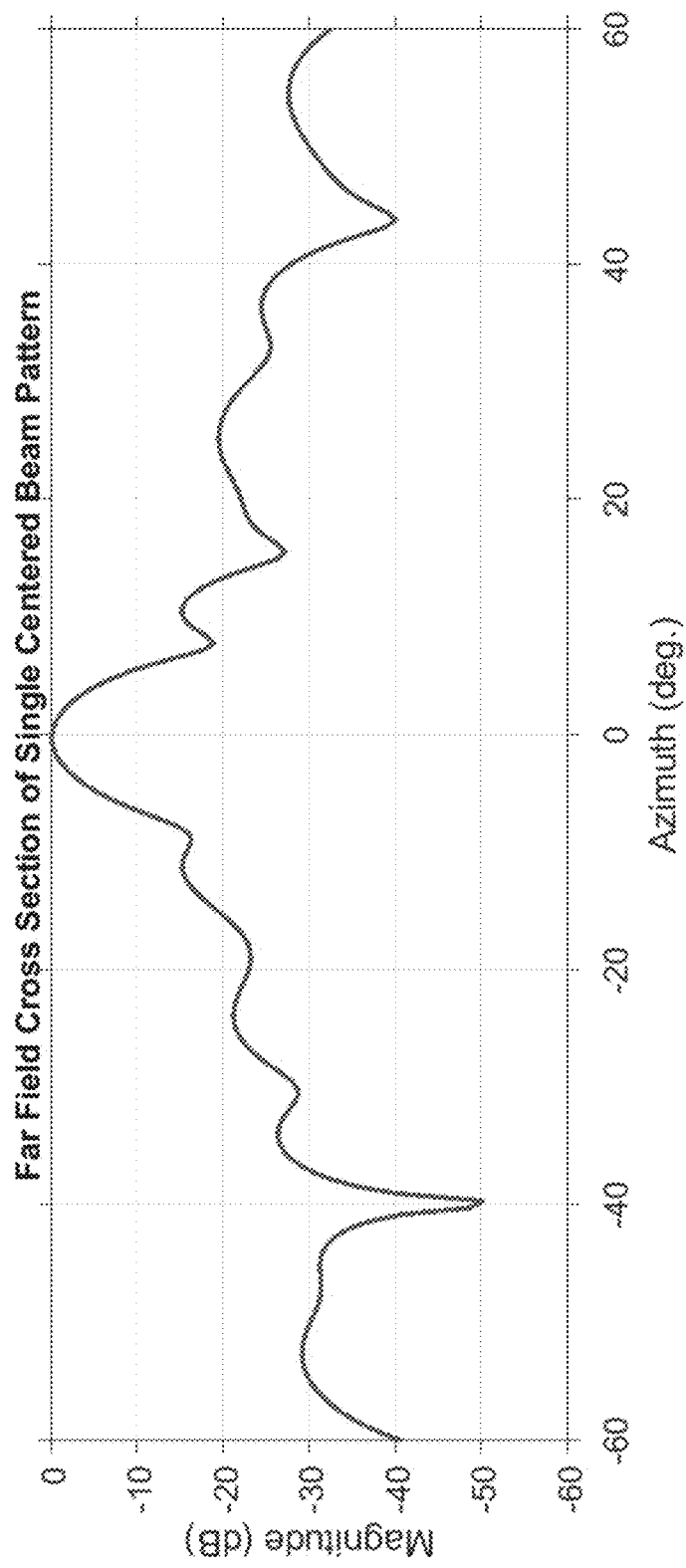

FIG. 13 illustrates the azimuth display of the radiation pattern of a single peak in the middle.

Figure 14:
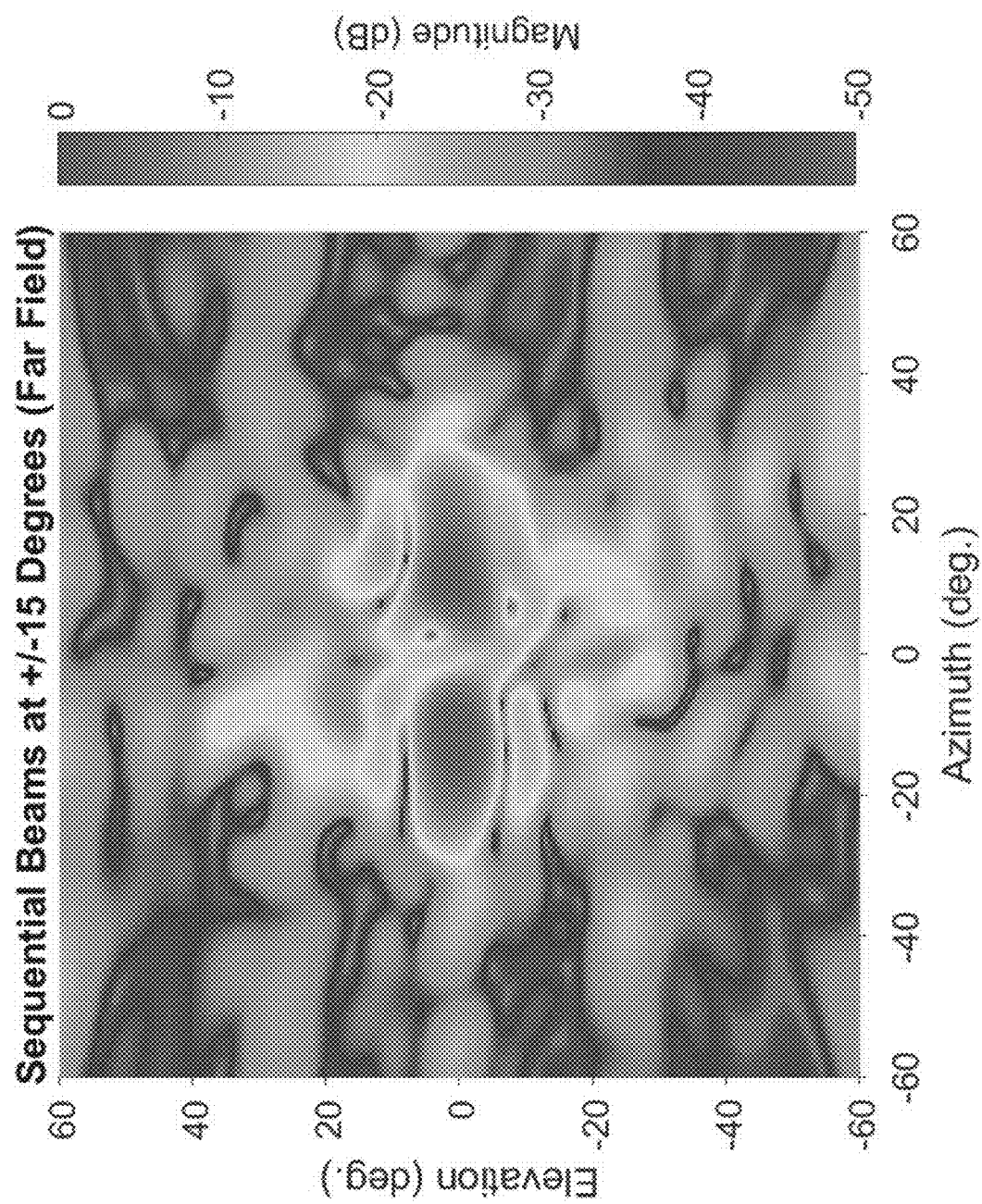

FIG. 14 illustrates far-field radiation patterns in the sequential method for two beams in −15 and +15 degrees, respectively (note the far-field pattern clearly demonstrates two strengths).

Figure 15:
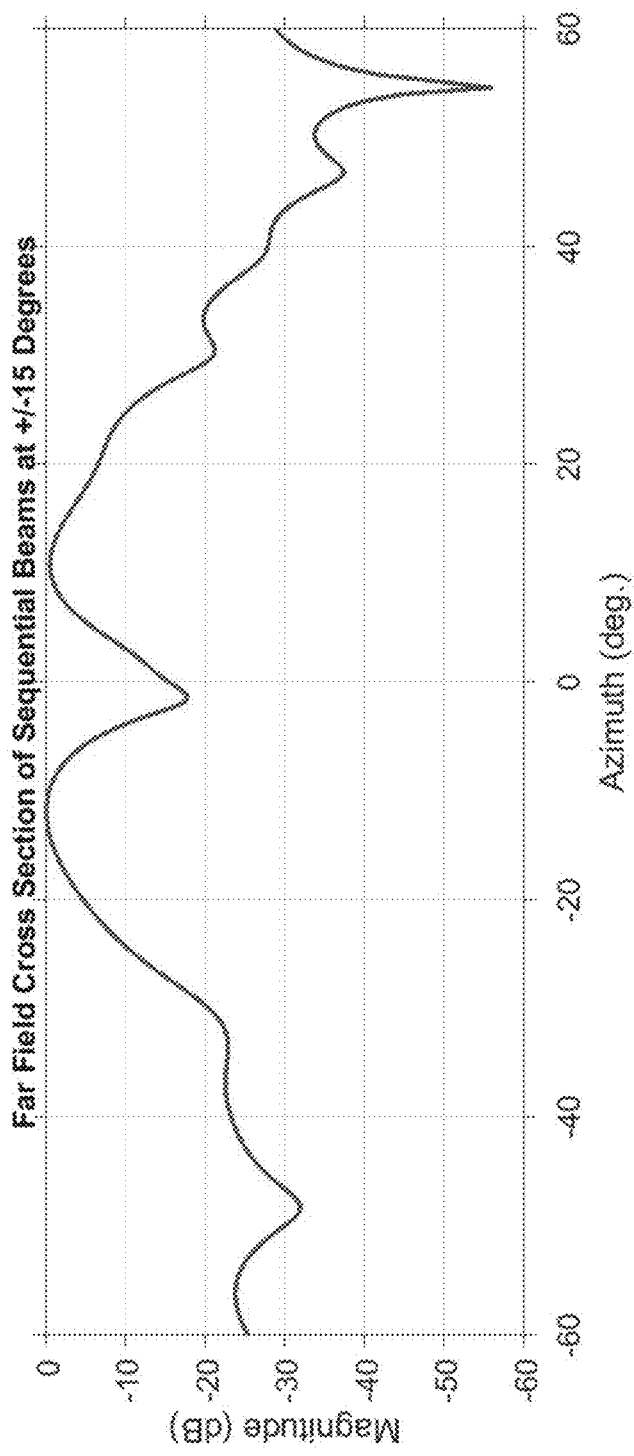

FIG. 15 illustrates the azimuth display of the radiation pattern in the sequential method.

Figure 16:
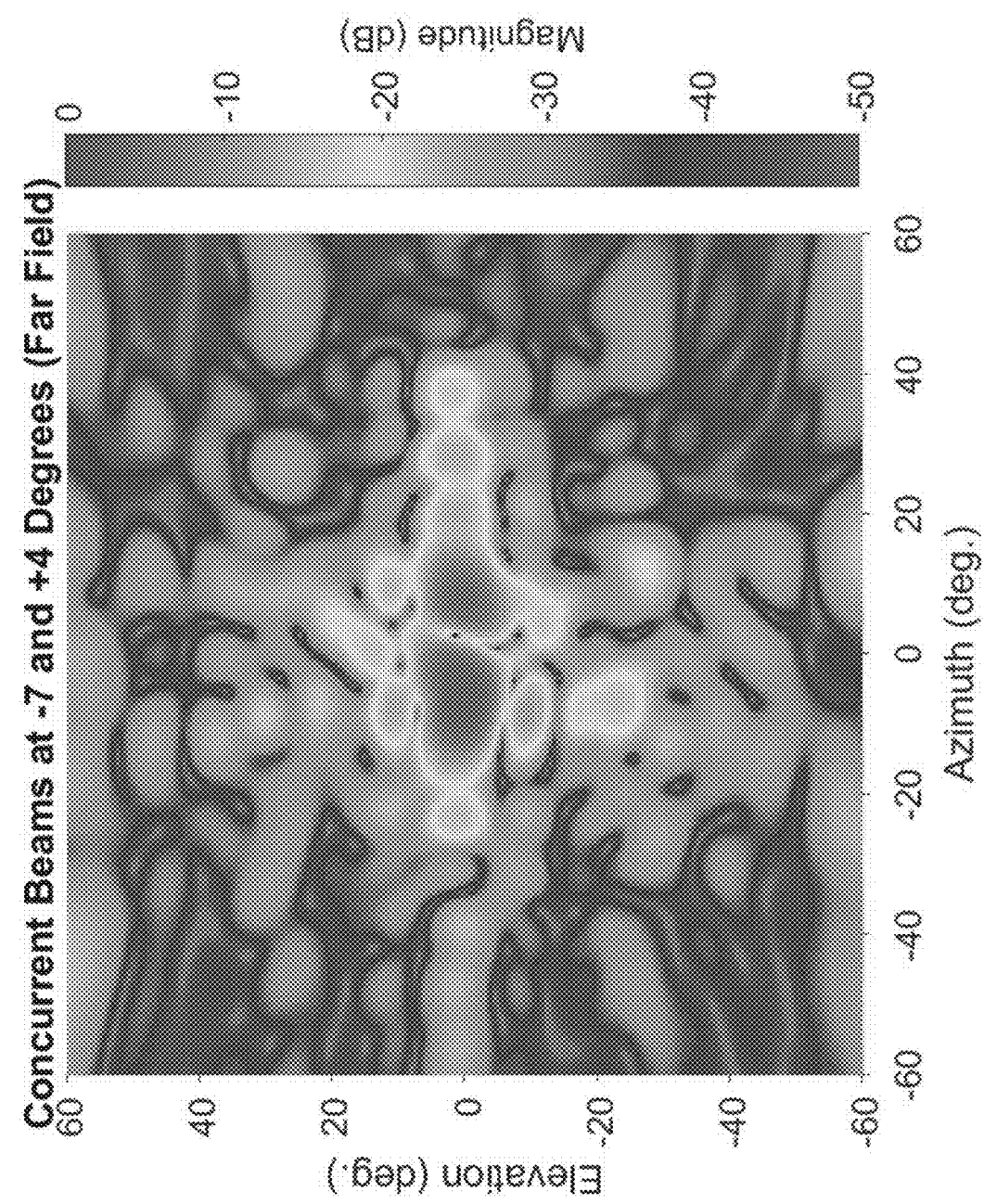

FIG. 16 illustrates the far-field radiation patterns in the concurrent method for two beams in −7 and +4 degrees, respectively.

Figure 17:
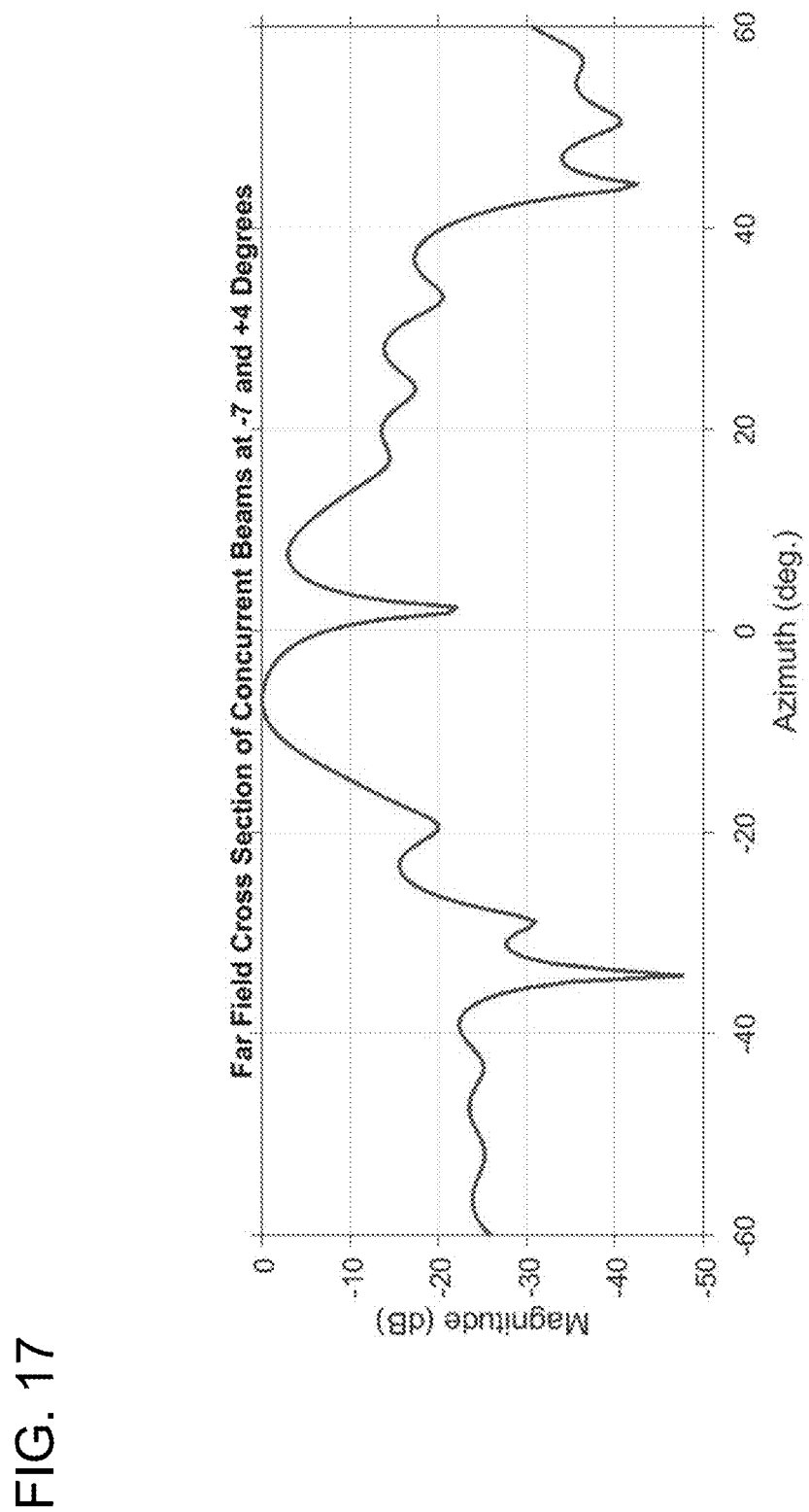

FIG. 17 illustrates the azimuth display of the radiation pattern in the concurrent method.

FIGS. 18A-18D illustrate sensing results using different techniques: 18A) MIMO radar (conventional beam forming); 18B) traditional phased array; 18C) MIMO radar (compressed sensing); and 18D) transform sensing.

FIGS. 19A-19D illustrate sensing efficiency using different techniques: 19A) MIMO radar; 19B) traditional phased array; 19C) transform sensing starts from the narrowest beam; and 19D) transform sensing starts from 8× the narrowest beam.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The present disclosure addresses a novel feedback design methodology to meet the emerging frontiers of beamforming radio frequency (RF) technology in the areas of machine learning and surveillance. The feasibility of developing adaptive waveform modulation schemes for spectrum management in radars via orthogonal wavelet concepts. With the increasing prevalence of RF spectrum bandwidth limitations, this approach of adaptive feedback waveforms addresses advanced signal processing beamforming technique for phase array RF improving overall sensing performance. The adaptive illumination waveform algorithms for enhancing detection, discrimination, and tracking is motivated from the analogy drawn between the cellular wireless communication systems and the general multi-static radar automotive systems. The present innovation has developed signal processing schemes of adaptive illumination waveforms for enhancing RF detection performance and have developed a unified system architecture of the adaptive radar waveform design for various scenarios including multi-static radars and multiple targets. To illustrate the effectiveness of the approach, a performance comparison of the developed system with the conventional linear frequency modulated waveforms and other implemented waveform adaptation algorithms is presented. A software-defined phase array evaluation platform was used to demonstrate the performance improvement of the adaptive transform sensing feedback design.

The new waveform study not only realizes a new practical waveform for SAR, (state-of-the-art) but also provides a practical way to produce the compressed pulse waveform via the digital signal processing method. By starting from different pulse waveforms (any short pulses, such as the rectangle pulse and raised cosine pulse, or any other existing radar waveform, such as the spectral disjoint radar waveform and the phased coded waveform for the detection performance improvement), the proposed method decomposes the original waveform into sub-waveforms, and keeps the characteristic of the original waveform. Therefore, this patent provides a flexibility way to generate diverse waveforms, and it can assist the modem radar to adapt to different targets and environments.

Current technology and commercial needs are requiring new forms of phase array beamforming design in the areas of spectrum RF technology. After the transmitter generates a transform sensing pattern in the space, the receiver is expected to receive all the weighted reflections of the targets. Consequently, a relatively wide beam is expected by the radar receiver, and the sensing result will be the transform coefficients for the basis functions to the interested area. One method for generating the wide beam in receiver is using a single element for radar receiver. However, it will waste coherent signal gain of the radar receivers. Alternatively, we can implement the transform sensing pattern in a MIMO transceiver system. In doing so, the transmitters of MIMO will generate a designed transform sensing pattern coherently in multiple directions. The receivers of MIMO will differentiate the directions and obtain the transform coefficients directly. Transform sensing feedback provides a robust waveform diversity for synthesizing an adaptive radar control system for feature detection with structured parametric uncertainty. Transform sensing defines the methodology of using an array of antenna elements to transmit and receive small waves, or wavelets, for the isolated detection of an RF signal of interest, or radar return, in the presence of noise. The robustness is achieved by new waveform control of wavelet coefficients, minimizing the effect of disturbance noise. For all wavelet types, the coefficients are normalized by the maximal value in the coefficient vector. The purpose of this normalization allows the beamstate generation process to have full control over transmit power. This patent has developed discrete wavelet based signal processing schemes of adaptive illumination waveforms for enhancing RF detection performance based on our earlier work with transform sensing theory in the development of interference avoidance via orthogonal waveforms for radar. We have developed a unified system architecture of the adaptive radar waveform design for various scenarios including multi-static radars and multiple targets. To illustrate the effectiveness of the approach, a comparison of the performance of the developed system with the conventional linear frequency modulated waveforms and other implemented waveform adaptation algorithms. The proposed transform sensing represents a parallel beam-pattern approach for radar sensing.

Metrics to measure advantages of transform sensing feedback theory:

1) Scanning speed for detection: Traditional phase array is sequential using 100% of the sensing time. Coherent MIMO phase array should have a significant sensing time reduction.

2) Image Resolution: For current state-of-the-art phase arrays, the pulsed width is wide. The demonstrated coherent phase array has increase resolution by the decomposition of the wide bandwidth waveforms into multiple small bandwidth waveforms.

3) Beam Width: For current state-of-the-art phase arrays, the beam width is fixed. We have demonstrated beams of various patterns and width, by the use of the coherent MIMO. A software-defined phase array evaluation platform was used to demonstrate the performance improvement of our proposed adaptive modulation design.

Phased array generates effective radiation patterns in a desired direction via adjusting the phase of each array element.

Due to its rapid and inertialess scanning, the phased array radar is replacing the traditional mechanical scanning radar these years [1]. As the number of the array elements increases, phased array can generate an extremely narrow beam. Though the narrower beam ensures high angle resolution, it still takes a long time to cover a wide looking angle via electronically steering the narrow beam. To overcome this shortcoming, digital beam forming technique [2] generates the omnidirectional beam in the space, and simultaneously shapes multiple virtual narrow beams in different angles after post-processing the received signals from different receiver elements. However, digital beam forming itself does not change the actual transmission beam pattern in desired looking angles, and thus cannot distribute transmission power in the space. The multiple-input multiple-output (MIMO) radar system [3] is another technique proposed to virtually shape narrow beam for estimating the direction of arrival (DOA) of target. It assumes that the transmitted signal associated with each transmit element can be identified in the receiver's post processing. Consequently, the MIMO radar can virtually generate a large array aperture, which increases the number of resolvable targets using a less number of array elements. However it is impossible to generate a totally orthogonal waveform set for transmitters. Only discrete-orthogonal waveform or time division waveform [4] is applied. The increment of angle resolution comes at the price of losing coherent processing gain at the transceiver side, which on the other hand, is a major advantage of phased array. The above techniques focus on sensing or recovering the spatial information pixel by pixel, and the beam pattern is fixed. To generate different desired array patterns, Steyskal [5] has studied the method of synthesizing antenna patterns with prescribed nulls at a given set of angels. He further applied the Fourier transform on wideband circular arrays to synthesize beam patterns [6]. It shows that Fast Fourier Transform (FFT) can lower the calculation complexity for digital beamforming. However, there is no study directly generating transform basis in the space to sense the spatial information in a transformed domain.

Wavelets and wavelet transforms have been successfully utilized in audio, image and video processing in recent years, including the JPEG2000 image compression standards [7]. Because of the time-frequency localization of the wavelets, applying wavelet transform to images leads to an effective image compression. Similar study on radar image shows that wavelet transform can compress [8] and smooth [9] radar images. Other studies considering the multi-resolution method in radar applications, include beamforming [10], modeling [11], and signal analysis [12]. However, there is no study applying the wavelet to radar sensing, except a few radar waveform studies [13]-[15] or radar signal analysis studies [16], [17]. In the present disclosure, we propose a revolutionary sensing feedback mechanism called transform sensing for phased array as well as MIMO systems using wavelets. By this new approach, the array will form beams in parallel, which constitute a wavelet transformation, and the space is sensed in the transformed domain. Consequently, sensing can cover a wider area at a high speed, and critical areas can still be closely observed. The new approach can reduce the volume of collect data by one order of magnitude, while the high resolution is still gained by the increased number of elements. In this patent, we present a new sensing feedback mechanism, named transform sensing, for the phased array or the MIMO system to generate multiple beam patterns in the space. Taking the multi-resolution advantage in the spatial-frequency of the wavelets, transform sensing can generate multiple beam patterns using wavelet bases.

Consequently, each sensing result is equivalent to a wavelet transform coefficient. Recall that there are a large number of null coefficients when applying wavelet transform to an image. The Transform sensing applied to phased array does not need to deploy all the wavelet sensing patterns to the space. It generates coarse to detailed patterns to sense a targeted area. The coarse sensing patterns (i.e. wide beam pattern) are firstly applied to cover a wide area using less sensing times. After thresholding the coarse sensing results, the radar system can automatically determine which new sensing pattern is necessary for the next detailed level scanning. In this way, the transform sensing radar system can eliminate redundant sensing, and thus improving sensing efficiency.

Simulations and experiments demonstrate how to generate the transmission patterns and obtain sensing result via the transform sensing mechanism. The results also demonstrate that transform sensing obtains high resolution samples on the target area, while spending less time on non-target areas. In this way, the sensing generates an ideal performance, which balances resolution and efficiency. The feedback approach is as follows: Extract the coefficients from a predefined subset of the wavelet. Each index in the azimuthal vector corresponds to a finite difference in azimuth from one index to the next. By feedback of the signal, the predefined wavelet vector is resampled to match the length of the azimuthal vector, resulting in a one-to-one coefficient-to-azimuth match. If the wavelet is defined to have some arbitrary feature center, $\hat{I}$, the waveform can be translated and stretched by trimming and padding the resulting vector. The amount of padding and trimming depends on the number of indices that separate the desired feature center and its closest representative index in the azimuth array. The padding operation assumes edge value preservation. Some desired waveforms may have multiple center features or contain repeated, or concurrent, wavelets.

Because the proposed waveform inherit good sidelobe suppression ability of Gaussian waveform, it suppress the sidelobe better, and thus a much more clear image result can be obtained via the proposed waveform. Furthermore, the new waveform study also provides a practical way to produce the compressed pulse waveform via the digital signal processing method. When starting from different pulse waveforms (not only for the Gaussian waveform), the proposed method can decompose the original waveform into sub-waveforms, and keep the characteristics of the original waveform. As a result, the waveform design becomes flexible. It can take advantage of the original waveform and wavelets to produce sequences of decomposed waveforms. The decomposed waveforms together show the property of the original waveform. On the other hand, each of the decomposed waveform is a sub-frequency band of the original waveform, while the decomposed waveforms are flexible in transmission, and have the potential to adapt to targets and environments.

The process for generating wavelet coefficients depends on the type of wavelet that is desired for transmission. Continuous wavelet functions pose the simplest case, because coefficients may be extracted directly from the function. Discrete and more complex wavelet functions, however, require additional process logic and evaluation. Regardless of the type of desired function, at least two input parameters are required to output a useful series of coefficients: 1) a scalar stretching parameter, and 2) an azimuthal vector that contains wavelet sampling locations. The stretching parameter modifies the width, or sharpness, of the sampled wavelet. Each element in the physical transmitter array has a corresponding entry in the azimuthal vector. Some wavelet types require a third parameter that specifies the wavelet's azimuthal center, which acts as an offset value.

In general, all wavelet functions, denoted here by $\psi(\Phi)$, are subject to stretching and translation. When discreetly sampling $\psi$, the argument takes on the form of $$\Phi[k] = A(\phi_k - \theta).$$

Where A is the scalar stretching parameter, $\phi_k$ is the k'th element in the azimuthal vector, and $\theta$ is the desired azimuthal center of the wavelet.

FIG. 1 depicts the processes that are associated with constructing wavelet coefficients for analytic and non-analytic functions. Each branch is described herein.

Analytic Wavelet Functions

Some wavelet functions can be explicitly evaluated because they are described by an analytic expression, and are often referred to as being continuous wavelets. Coefficient generation for these functions are represented in FIG. 1 by the "analytic" process branch. Examples of these wavelet functions include, among others, the Morlet, Shannon, and Mexican Hat varieties. Evaluation of the continuous analytic expressions is performed by sampling the functions at the locations specified by $\Phi[k]$. $\theta$ translates the function across the independent axis to position its center upon the desired direction, and A stretches the function across the same axis to broaden or narrow its feature size. Here, the independent axis covers the span of the physical phased array's field of view. FIG. 2A is a graphical representation of the coefficient generation for a Mexican Hat wavelet.

For all wavelet types, the coefficients are normalized by the maximal value in the coefficient vector. The purpose of this normalization allows the beamstate generation process to have full control over transmit power.

Non-Analytic Wavelet Functions

Wavelet functions that do not have a precise analytic expression must be sampled from a subset of the desired function. Coefficient generation for these functions are represented in FIG. 1 by the "nonanalytic" process branch. Examples of these functions include, among others, the Daubechies, Symlet, and Biorthogonal varieties.

Unlike the analytic wavelets, the non-analytic varieties require additional attention to extract the coefficients. The easiest approach, and the approach used here, is to extract the coefficients from a predefined subset of the wavelet. Each index in the azimuthal vector corresponds to a finite difference in azimuth from one index to the next. The predefined wavelet vector is resampled to match the length of the azimuthal vector, resulting in a one-to-one coefficient-to-azimuth match. If the wavelet is defined to have some arbitrary feature center, $\theta$, the waveform can be translated and stretched by trimming and padding the resulting vector. The amount of padding and trimming depends on the number of indices that separate the desired feature center and its closest representative index in the azimuth array. The padding operation assumes edge value preservation. Some desired waveforms may have multiple center features or contain repeated, or concurrent, wavelets. Like the analytic wavelets, the coefficients are normalized by the maximal value in the vector. FIGS. 2B and 2C are examples of a single Haar and concurrent Haar wavelets, respectively, that are constructed using this process.

Example Coefficients

Consider a Haar wavelet like the one shown in FIG. 2B. On the interval [0, 1], the Haar wavelet contains a single discontinuity located at the interval's midpoint, and has the coefficients [1,0]. Let this discontinuity be a feature, and let the same structure of the wavelet be stretched along the interval of [−90°, +90°]. Continuing with the use of FIG. 2A as an example, the resulting becomes $$\Phi_{k=1\ldots9}=[-90°,-67.5°,-45°,-22.5°,0°,+22.5°,+45°,+67.5°,+90°].$$

With a total of nine values in the azimuth array, the Haar wavelet is resampled to attain a total of nine coefficients. Resampling for the Haar wavelet assumes edge value preservation, which produces the effect of linearly interpolating the original coefficients. The corresponding coefficient vector is $$\psi(\Phi=\phi_{k=1\ldots9})=[1,1,1,1,1,0,0,0,0].$$

The resolution, or accuracy, of resampling inherently depends on the size of the azimuth array. Since the length of that array is a one-to-one match for the number of transmitters in the physical array, more transmitters will yield a higher resolution sampling.

Suppose the feature location was desired to be $\theta=-40°$. By inspection, this location occurs closest to k=5 in the azimuth vector, with an error of 5°. The error can be corrected for by shifting the azimuth vector by the error amount. With larger vectors, the index would be found by finding the index that minimizes the difference between the element at that index and the desired direction. The original feature location was at k=5, hence the feature must be shifted to the left by two (5−3=2) indices. To perform the shifting, the wavelet function is first resampled as if no shifting is to occur. Then, the left side of the vector is trimmed by two indices, and then two value preserving values are appended to the vector. Here those values are zero. The effective vector of coefficients becomes $$\psi(\Phi=\phi_{k=1\ldots9})=[1,1,1,0,0,0,0,0,0].$$

These coefficients are subsequently passed to the beamstate generator.

Because transform sensing directly senses in the representation domain, the feedback approach for this technique is how to determine the next sensing pattern based on the previous sensing results. It is different from the compressed sensing approach, which has a fixed amount of sensing patterns deploying in an arbitrary sequence. For transform sensing, sensing efficiency is determined by the accuracy of the prediction of coefficient locations. If one can predict accurately, transform sensing can use fewer sensing patterns.

Compressed sensing senses the image in the sensing domain, which is incoherent with the image's representation domain. An optimization algorithm has to be used to approximate the sparsity information in the representation domain. As regard to the definition of sparsity, assuming that a signal has length n, sparsity means that we can represent it with k<<n nonzero coefficients in the representation domain.

The disadvantage of using an optimization algorithm is in the high cost of calculation and unstable solvability. However, the low spatial-frequency part of the image representation domain has a much higher probability for having large magnitude coefficients, with a much smaller number of coefficients than the remaining high spatial-frequency part. To take advantage of this fact, transform sensing directly senses the image in the representation domain. It first senses the low spatial-frequency part for effective sensing. Based on the sensing results of low spatial-frequency, the user determines which portion of the image needs high spatial-frequency sensing. Therefore, user does not need to transform the image from the sensing domain back to the representation domain as in compressed sensing. The user directly obtains the relevant domain information. The basic addition/subtraction, and convolution to perform inverse wavelet transform can then recover the scene. For these reasons, transform sensing is more reliable and costs less computational time than compressed sensing. In addition, transform sensing can use fewer sensing samples to recover the scene. The required number of sensings of compressed sensing is k2 log n in [21], or knα for a constant α in [22]. Otherwise, the optimization algorithm is unsolvable. With the analysis of the sensing data in the representation domain in real-time, transform sensing can reduce the required times of scanning according to the level of sparsity automatically.

We are using wavelet-denoising technique to predict the sparse coefficients and determine the next level sensing pattern. Wavelet-denoising is a technique applied in the image processing to abandon noise dominated wavelet coefficients and (or) reduce the magnitude of noise-influenced wavelet coefficients for signal restoration [23], [24]. A study [25] found that the sparse coefficients typically have a spatial relationship. The local support of neighboring wavelet coefficients is helpful in determining whether a coefficient corresponds to noise only. Further study [26] found that the temporal relationship is also helpful in identifying the sparse coefficients. In this study, we focus on scenes with no prior knowledge. We first apply a low-resolution wavelet to the scene for a quick scan, and then wavelet-denoising is applied for both shrinking the coarse wavelet coefficients and determining the location of detailed sparse coefficients, which lead to new sensing patterns. Once the detailed sensing patterns are deployed, the wavelet-denoising process is performed to analyze the received signal again. So forth and so on, until a fine resolution is achieved. Simulation result has shown that the transform sensing uses a smaller number of scanning times to recover the scene. Experiments have further illustrated the feasibility of generating sensing pattern identical to transform basis.

In Section I, we introduce the basics of phased array as well as wavelet transform. In Section II and Section III, the realization of different sensing patterns by phased array and its extension to MIMO are discussed in detail. Meanwhile, the trade-off between antenna gain and beam coverage is also discussed. Section IV describes the mechanism of transform sensing for selecting sensing patterns. Simulation and experimental results are shown in Section V.

I. TRANSFORM SENSING BASICS

A. Phased Array

Traditional phased array directs its beam via adjusting the phase differences among elements. As shown in FIG. 3, as long as the phase difference between two adjacent elements is set according to delay x, a beam will be shaped at angle θ to the broadside of the array.

Assume that each array element has magnitude E0, the electrical field at angle θ can be calculated as below:

$$E(\theta) = E_0 \sum_{n=0}^{N-1} \exp\left(-j\frac{2\pi n d \sin\theta}{\lambda}\right) = E_0 \frac{1 - \exp\left(-j\frac{2\pi N d \sin\theta}{\lambda}\right)}{1 - \exp\left(-j\frac{2\pi d \sin\theta}{\lambda}\right)}. \quad (1)$$

Thus, the far field array intensity pattern is:

$$\begin{aligned}
|(E(\theta))| &= \sqrt{E(\theta)E^*(\theta)} \quad (2)\\
&= E_0 \sqrt{\frac{\left(1-\cos\frac{2\pi N d \sin\theta}{\lambda}\right)^2 + \left(\sin\frac{2\pi N d \sin\theta}{\lambda}\right)^2}{\left(1-\cos\frac{2\pi N d \sin\theta}{\lambda}\right)^2 + \left(\sin\frac{2\pi N d \sin\theta}{\lambda}\right)^2}}\\
&= E_0 \sqrt{\frac{2 - 2\cos\frac{2\pi N d \sin\theta}{\lambda}}{2 - 2\cos\frac{2\pi N d \sin\theta}{\lambda}}}\\
&= E_0 \sqrt{\frac{\left(\sin\frac{\pi N d \sin\theta}{\lambda}\right)^2}{\left(\sin\frac{\pi d \sin\theta}{\lambda}\right)^2}}\\
&= E_0 \left|\frac{\sin\frac{\pi N d \sin\theta}{\lambda}}{\sin\frac{\pi d \sin\theta}{\lambda}}\right|.
\end{aligned}$$

The one-way beam pattern is:

$$G_0(\theta) = |(E(\theta))| = E_0 \left|\frac{\sin\frac{\pi N d \sin\theta}{\lambda}}{\sin\frac{\pi d \sin\theta}{\lambda}}\right| \quad (3)$$

When integrating a large amount of array elements (i.e. N→∞), the antenna pattern tends to be a sinc function, and its main beam is of reciprocal proportion to the number of array elements. The phased array behavior as described above will be used by transform sensing to generate arbitrary beam patterns in the space.

A. Transform Sensing Basics

For transform sensing, we propose to generate a series of sensing patterns, say $f_k(m)$ functions (k=0, 1, 2, 3, ...), to sense the area x(m). When the sensing pattern $f_k(m)$ is applied to the sensed area x(m), the received signal will be the summation of multiplying this sensing pattern to the sensed area x(m). A single value X(k) called coefficient will be obtained:

$$X(k) = \langle x(m), f_k(m) \rangle \quad (4)$$

Note that this paper focuses on scanning in different angles. The sensing pattern $f_k(m)$ is a customized one-way beam pattern, and m corresponds to different scanning angle θ. We will further discuss how to generate a beam pattern in Section III.

We propose to generate the beam pattern to be consistent with the transform basis. Taking discrete cosine transform (DCT) as an example, $f_k(m)$ will be $$\cos\left[\frac{\pi}{M}(m+1/2)k\right] \cdot k = 0, \ldots, M-1.$$

If we are transmitting a sinusoid signal in a specific spatial frequency to the space as the beam pattern and receive the integration of all the weighted reflections of the targets, the sensing result will be the DCT coefficient for a spatial frequency. Since radar can separate target range, velocity and DOA using appropriate waveform design and related processing method, we only consider targets within the same range and velocity bin here. Note that X(k) is the integration of all the weighted reflections of the targets. Many of the X(k)s may be null, and can be discarded in real-time without affecting the resolution of the result.

In this patent, we apply wavelet transform in the spatial domain, i.e. $f_k(m)$ is of wavelet basis. The reason is that the wavelet basis can adapt its width (i.e. the so called time-frequency localization) according to different resolution requirements. The varying beam width of wavelets as transform basis also has potential to adapt to the gain requirement, which will be further discussed in Section V-A. In summary, every sensing pattern is a wavelet, and each received sensing result will be the wavelet coefficient.

B. Wavelet Transform Basics

According to the wavelet theory [27], discrete wavelets are generated using generation coefficients h[m]. It generates two types of sensing patterns, the scaling function $\varphi_k[m]$ and the wavelet function $\psi_k[m]$ in different generation iterations k (k=0, 1, 2, 3, ...). In our definition, the iteration reflects the resolution of the sensing pattern. A smaller number of iterations generates a narrower sensing beam pattern. The narrower pattern takes a longer time to sense the area, but keeps more details. A higher number of iterations will take more time to generate the sensing pattern since more scaling and wavelet functions need to be generated through computation. In case the computation time is too long to prevent real-time applications, various patterns can be generated off-line and stored in the memory for use in real-time. This can reduce the impact to real-time applications.

Similar to Eq.(4), sensing using scaling and wavelet functions generates coefficients ckj and dkj, respectively:

$$c_{kj} = <x(m), \varphi_{kj}(m)> = \sum_m x(m)\varphi_{kj}(m). \quad (5)$$

$$d_{kj} = <x(m) \cdot \psi_{kj}(m)> = \sum_m x(m)\psi_{kj}(m). \quad (6)$$

Note that j corresponds to the shifts of the sensing pattern. The shift step equals to $2^k$, where k is the iteration of the sensing pattern.

For example, when we are sensing an area x(m), m=1, 2, 3, ..., M, where M=$2^C$ and C is a constant corresponding to the size of the sensing area, if we are using scaling and wavelet functions with iteration k, we will use $\varphi_k$ [m] and $\psi_k$[m] to sense the area, and shift both the functions by $2^k$ pixels for the next sensing cycle. In the end, we will obtain coefficients $\{c_{k,1}, c_{k,2}, \ldots, c_{k,2^{C-k}}, d_{k,1}, d_{k,2}, \ldots, d_{k,2^{C-k}}\}$. Therefore, when we are using scaling and wavelet functions with less iterations, we will obtain more coefficients (i.e. more details).

One interesting property of wavelets is multiresolution, i.e. the summation and subtraction of $\{c_{k,1}, c_{k,2}, \ldots, c_{k,2^{C-k}}\}$ and $\{d_{k,1}, d_{k,2}, \ldots, d_{k,2^{C-k}}\}$ will generate coefficients $\{c_{k-1,1}, c_{k-1,2}, \ldots, c_{k-1,2^{C-k+1}}\}$.

It means that we can sense the area using different resolution (iteration) functions. We can first sense the area using a coarse scaling function. Based on the sensing result, we can use a coarse wavelet function on the interested area. After summation and subtraction, it is equivalent to sense the interested area using detailed scaling functions, while the irrelevant area using coarse sensing functions.

For the wavelet feedback approach, we narrow down the selection of the basis function set to wavelets due to the multiresolution property, which allows the sensing pattern to vary according to the previous sensing result. For example, let the coarse scaling sensing pattern scan a large sensing area. The corresponding wide beam pattern is ideal for the radar to sense a wide area quickly. Once suspicious targets are found, the radar applies the detailed wavelet sensing pattern to the suspicious area. After integrating the detailed wavelet sensing result with the previous sensing result, suspicious targets can be further differentiated. If we need higher resolution, a wavelet with less iteration (i.e. narrower beam pattern) can be further applied. Again, integrating with the results obtained earlier, the radar can obtain a high spatial resolution of the target area. We can iterate this process, until a high enough resolution is obtained for the target area (FIG. 4).

II. TRANSFORM SENSING PATTERN FOR PHASED ARRAY

Creating a transform sensing pattern in space entails alternating the sensing power when the system surveys an area using the phased array. The amplitude is alternated in such a way that it generates a desired transform sensing pattern in the space. We propose to develop a simultaneous beam forming technique, which can generate the desired pattern collectively by all the elements.

Generating Transform Sensing Pattern

FIG. 5 illustrates how the technique works. By conventional beam forming in the phased array, if each array element transmits a sinusoidal wave with a user-defined phase in proportion to the position of the element, one beam in a specific direction will be generated. In the new approach each element is to transmit multiple sinusoidal waves, each with its own phase delay according to different beam directions, and multiple beams can be generated simultaneously. Furthermore the amplitude of each wave is modulated according to the coefficient value of a transform. As a result, a sensing pattern is formed collectively by all the elements.

Mathematically, the approach can be described as follows. Assume that we have a set of discrete spatial points constructing the basis function $f_k$[m] in the space: $f_k$[m]=[$A_1$, $A_2$, $A_3$, ..., $A_m$]. Note that the basis function in this paper is a wavelet basis function. $f_k$[m] can be a scaling function $\varphi_k$ [m] and/or a wavelet function $\psi_k$[m]. To realize the basis function in the space, amplitude $A_1$ should be directed to θ, amplitude $A_2$ to 2θ, and amplitude $A_m$ to mθ. Thus, the waveform for each array element should be:

$$W_1 = A_1 \cos(w_c t + 1 \cdot \Theta_{A1}) + A_2 \cos(w_c t + 1 \cdot \Theta_{A2}) + \ldots + A_m \cos(w_c t + 1 \cdot \Theta_{Am}),$$

$$W_2 = A_1 \cos(w_c t + 2 \cdot \Theta_{A1}) + A_2 \cos(w_c t + 2 \cdot \Theta_{A2}) + \ldots + A_m \cos(w_c t + 2 \cdot \Theta_{Am}),$$

...

$$W_n = A_1 \cos(w_c t + n \cdot \Theta_{A1}) + A_2 \cos(w_c t + n \cdot \Theta_{A2}) + \ldots + A_m \cos(w_c t + n \cdot \Theta_{Am}), \quad (7)$$

where $w_c$ is the carrier frequency and $\Theta_{Ai}$, i=1, 2, ..., m, is the phase delay between elements. Since the amplitudes vary in terms of each point in the basis function, the desired sensing pattern is generated when the phased array elements collaborate by using different $\Theta_i$ for each coefficient. However, according to the above equations, each element should use multiple delay lines and amplifiers to shape the desired beam pattern, which cannot be realized in reality. Our study discovers that the element equation can be simplified. Consider element i as an example. We can see that $$W_i = A_1\cos(w_c t + i \cdot \Theta_{A1}) + A_2\cos(w_c t + i \cdot \Theta_{A2}) + \ldots + A_m\cos(w_c t + i \cdot \Theta_{Am}) \quad (8)$$

$$= \sum_{j=1}^m (A_j \cos(w_c t)\cos(i \cdot \Theta_{Aj}) - A_j \sin(w_c t)\sin(i \cdot \Theta_{Aj}))$$

$$= \cos(w_c t)\sum_{j=1}^n (A_j \cos(i \cdot \Theta_{Aj})) + \sin(w_c t)\sum_{j=1}^m (A_j \sin(i \cdot \Theta_{Aj})).$$

$$\text{Let } x = \sum_{j=1}^m (A_j \cos(i \cdot \Theta_{Aj})) \text{ and } y = \sum_{j=1}^m (-A_j \sin(i \cdot \Theta_{Aj}))$$

Then one has $$W_i = x\cos(w_c t) + y\sin(w_c t) \quad (9)$$

Assuming $$a_i = \sqrt{x^2 + y^2} \quad (10)$$

$$\Theta_i = \begin{cases} \arctan\left(\frac{y}{x}\right), & \text{if } y \geq 0 \cdot x \geq 0 \text{ or } y < 0 \cdot x \geq 0 \\ \arctan\left(\frac{y}{x}\right) - \pi, & \text{if } y \leq 0 \cdot x < 0 \\ \arctan\left(\frac{y}{x}\right) + \pi, & \text{if } y > 0 \cdot x < 0. \end{cases} \quad (11)$$

we obtain:

$$W_i = a_i \cos(w_c t + \Theta_i) \quad (12)$$

Eq. (12) states that the elements in the phased array no longer coordinate in a conventional way using a fixed phase delay between elements, but have each a special delay calculated according to the desired sensing pattern. That means that first the cost to implement the new approach will not be higher than the conventional phased array. Secondly it opens the door to flexible operations of the phased array, forming a sensing pattern or forming a sharp beam. The phased array can still form a single beam for high-resolution sensing, or form a small sensing pattern for a reduced field of view. In both cases, the power of the radar beams will increase to benefit the signal to noise ratio (SNR). Consequently, the phased array radar becomes adaptive to the resolution, the field of view, and the desired transformation.

B. Beam Coverage and Array Gain

The sensing pattern generated by the proposed method can shape a wide beam pattern corresponding to the basis function $f_k[n]$. One concern is the array gain, which influences the signal to noise ratio, when applying this wide beam pattern.

According to Eq. (12), the maximum amplitude of the transmitter elements is $|W_{i\_peak}| = |a_i|$. The upper limit of $|W_{i\_peak}|$ can be estimated as:

$$|W_{i\_peak}| \leq \sum_{j=1}^{n} |A_j|. \quad (13)$$

The equal in Eq. (13) holds if and only if $A_1, \ldots, A_j$ are in phase in Eq. (8).

Typically, the maximum voltage for each array element is consistent, i.e. $|W_{i\_peak}| \leq E_0$. When one transmitter element is using the maximum voltage, the voltage distributed to each spatial looking angle is:

$$E_0 \frac{|A_i|}{\sum_{j=1}^{n} |A_j|}. \quad (14)$$

Recall in Eq. (3) that the boresight signal amplitude can be approximated by $NE_0$, when N transmitter elements are deployed. Thus, the maximum amplitude distributed to each spatial direction is:

$$NE_0 \frac{|A_i|}{\sum_{j=1}^{n} |A_j|}. \quad (15)$$

Eq. (15) is consistent with the fact that the width of the sensing beam is reversely related to the array gain. Meanwhile, it also hints that a set of constant magnitude sensing bases will be helpful in generating equal gain sensing patterns in the space. Because Haar wavelets have sharp beam in the spatial domain with constant magnitude sensing basis, we select Haar wavelets as an example in this paper.

III. TRANSFORM SENSING PATTERN IMPLEMENTED IN MIMO RADAR SYSTEMS

After the transmitter generates a transform sensing pattern in the space, the receiver is expected to receive all the weighted reflections of the targets. Consequently, a relatively wide beam is expected by the radar receiver, and the sensing result will be the transform coefficients for the basis functions to the interested area. One method for generating the wide beam in receiver is using a single element for radar receiver. However, it will waste coherent signal gain of the radar receivers. Alternatively, we can implement the transform sensing pattern in a MIMO transceiver system. In doing so, the transmitters of MIMO will generate a designed transform sensing pattern coherently in multiple directions. The receivers of MIMO will differentiate the directions and obtain the transform coefficients directly.

A. MIMO Array Configuration

Without loss of generality, both the transmitter and receiver elements are of uniformly linear array for the MIMO radar system. We further assume an array with $M_t$ transmitter elements, and $M_r$ receiver elements. Assume that we place the transmitter and receiver elements in a row.

The transmitter elements are separated by $D_t$ and the receiver elements are separated by $D_r$, as shown in FIG. 6.

In FIG. 6, we assume that the leftmost element is element #1. The relative distance between transmitter #1 and receiver #1 is $(M_t-1)D_t+D_r$. The relative distance between transmitter #i and receiver #j can be calculated as $$(M_t-1)D_t + D_r \times j \quad (16)$$

By the above formula, the relative distance is determined by $D_t$, $D_r$, $M_t$, $M_r$, and the selected transmitter and receiver pair. The more different the relative distance of a transmitter and receiver pair is, the better MIMO array can resolve targets in the spatial domain [3]. To find how many different relative distances a MIMO may have, we need to specify $D_t$, $D_r$, $M_t$, and $M_r$.

Take the phased array as an example. Let $D_t = D_r$, and assume that three transmitter elements (i.e. $M_t = 3$) are placed in a sequence. We can describe the spatial location of the transmitter elements as below:

(1,1,1), where 1 means the positions with a single transmitter element, and 0 means the positions with no transmitter element. We further assume that three receiver elements (i.e. $M_r = 3$) are placed in a sequence:

(1,1,1).

Then the number of different relative distances can be calculated as:

(1,1,1)⊗(1,1,1)=(1,2,3,2,1), where ⊗ represents convolution. The above equation shows that there are one transmitter and receiver pair for each relative distance of $D_r$ and $5D_r$, two transmitter and receiver pairs for each relative distance of $2D_r$ and $4D_r$, and three transmitter and receiver pairs for the relative distance of $3D_r$.

Since the advantage of the MIMO array is to have more different relative distances [3], we can set $$D_t = M_r D_r. \quad (17)$$

For the phased array example shown before, we should set different transmitter and receiver element distances, i.e. $D_t=3D_r$. As a result, the spatial location of the transmitter elements is defined to be:

(1,0,0,1,0,0,1), and the three receiver elements are still placed as:

(1,1,1),

Then the number of different relative distance changes to:

(1,0,0,1,0,0,1)⊗(1,1,1)=(1,1,1,1,1,1,1,1,1).

Therefore, there is one transmitter and receiver pair for each relative distance of $D_r$, $2D_r$, $3D_r$, $4D_r$, $5D_r$, $6D_r$, $7D_r$, $8D_r$, and $9D_r$.

One may argue that we can also set receiver elements far apart instead of transmitter elements, i.e. $D_r=M_tD_t$. In reality, however, separating transmitters far apart will be more feasible to reduce the interference between transmitter elements. In this paper, we set the distance between every two adjacent receiver elements $\lambda/2$, and the distance between every two adjacent transmitter elements $M_r\lambda/2$.

B. MIMO Array Generates Transform Sensing Pattern

One major advantage of the MIMO radar is its sensing efficiency. It is assumed that the transmitters can generate orthogonal waveforms, and after the waveforms are transmitted in space simultaneously, the receivers can separate different transmitter's signal in post-processing. Consequently, a higher resolution with the same number of array elements can be achieved by the MIMO radar [3]. The MIMO radar also has a significant disadvantage as compared to phased array. It does not allow for coherent processing at the transmitting array; therefore, it lacks robustness against sensor noise and RCS (Radar cross section) fading. In [28], it shows that the MIMO radar has $M_t$ times smaller "clear region" as compared to the phased array radar. To overcome the limits of the MIMO radar and the phased array, transform sensing uses the MIMO radar's placement of transmitter and receiver elements, i.e. $M_r$ receivers with $D_r=\lambda/2$, and $M_t$ transmitters with $D_t=M_rD_r$. Different from the MIMO radar using orthogonal wave-forms for transmitters, transform sensing generates a desired beam pattern using the transmitting array alone (Eq. (12)). In FIG. 7A, a user defined transmitting pattern is realized in the space. Due to the transmitter's element spacing, the grating lobes causes ambiguity of the transmitter beam pattern. The receiver's digital beamforming (Eq. (3)) can help avoid this ambiguity. Combining the transmitter and receiver sensing patterns, the MIMO radar using transform sensing can generate arbitrary sensing bases in the space with a high resolution (FIG. 7B).

Because of the transceiver sensing pattern, the MIMO radar using transform sensing will receive the transform coefficients instead of pixels. In the next section, we will further study how the transform sensing mechanism can generate the sensing patterns in reality.

IV. TRANSFORM SENSING MECHANISM

As arbitrary sensing patterns can be generated in the space, we will study how to determine the sensing pattern for a particular application.

For transform sensing, the array first determines its widest beam pattern based on the gain requirement as shown in Section V-A. The widest beam pattern corresponds to the scaling function generated by K iterations: $\varphi_K[n]$. The pattern $\varphi_K[n]$ will guarantee that the radar system can use less time to cover a wide area. By steering $\varphi_K[n]$, coarse wavelet transform coefficients $c_{K,i}$ can be fast obtained, where i indicates different spatial locations.

FIG. 7: MIMO Radar Transmitter and Receiver Pattern

According to the thresholding method proposed in Section V-B, transform sensing can determine whether further sensing using $\psi_K[n]$ is needed in each $c_{K,i}$ area. After integrating $\psi_K[n]$'s sensing result with that of $\varphi_K[n]$'s, 1-level more detailed information of the target area corresponding to $c_{K-1,i}$ can be obtained. We can repeat this process, i.e. determine the threshold for the current level sensing result, and further choose $c_{K-1,i}$ which needs further sensing by $\psi_{K-1}[n]$. So forth and so on, the full resolution of the scene can be obtained gradually.

A. Determine the Widest Beam Pattern

In transform sensing, the widest beam is used to sense the environment as the first sensing pattern. The wide beam pattern can cover a large area and guarantee a fast but rough scanning of the scene. Based on the sensing result, one can determine which part of the area is of interest and needs further detailed sensing.

The widest beam pattern is determined by the minimum antenna gain required by the system in a single illuminated direction. For each scan, the illuminated direction receives signal strength as:

$$NE_0 \frac{|A_i|}{\sum_{j=1}^{n}|A_j|} \cdot \text{for any } i \in [1, 2, 3, \ldots, n]. \tag{18}$$

As we know that some wavelet coefficients have small values, it does not mean that a specific illuminated direction needs more power. The reason is that the coarse sensing pattern will illuminate that specific direction for multiple times. Taking Daubechies order-4 wavelets [29], [30] as an example, the 1-iterate scaling function is:

$$f_{D4}=[A_1,A_2,A_3]\approx[0.68,1.18,0.32,-0.18] \tag{19}$$

Instead of moving four pixels for the next scanning, the wavelet theorem suggests to move two pixels for the next scanning [31]. Note that $$A_1+A_3=A_2+A_4=1 \tag{20}$$

The shift of the wavelet sensing pattern will guarantee that each illumination direction receives the same amount of energy. Assuming that the minimum gain is $G_{min}$, the beam pattern should simply satisfy $$NE_0 \frac{1}{2^K} \geq G_{min}. \tag{21}$$

for the coarse scanning. Then, we obtain:

$$K \leq \log_2 \frac{NE_0}{G_{min}} \tag{22}$$

where K reflects the maximum iteration of scaling and wavelets functions, which we can use for sensing. As long as Eq. (22) is satisfied, there is enough energy to illuminate the targets in the scene.

Once the scaling function corresponding to the widest beam is determined, the corresponding scaling beam pattern can be deployed to sense the environment in a fast speed. Note that the width of the k iterated scaling function is $2^k$ times that of the narrowest beam. The speed to cover the whole area will also be improved by $2^k$.

As we discussed in Section II-C, we can first use the K iterated scaling function $\varphi_K$ [m] to sense the area, and generate rough sensing result $[c_{K,1}, c_{K,2}, \ldots, c_{K,2}C-K]$. Next, we should select K iterated wavelet function $\psi_K$ [m] to sense the target area, and obtain $d_{K,i}$. After integrating, we obtain 1-level detailed sensing result $c_{K-1,i}$ on the target area, and still keep the rough sensing result $c_{K,i}$ on the non-target area. Then, we can iterate this sensing process, and sense via $\psi_{K-1}$[m], $\psi_{K-2}$[m], ..., $\psi_1$[m] on the target area, until we obtain a high resolution information of the target. In the next subsection, we will discuss how to determine whether targets are presented in each small area covered by $\varphi_K$ [m] using thresholding.

B. Soft or Hard Threshold Determine Next Sensing Area

After the radar system senses the environment using the widest scaling beam pattern, the system further uses the wavelet beam pattern to sense only the interested area for obtaining a one-level more detailed sensing result. Next, the system will again determine which interested area needs further sensing using a two-level detailed wavelet beam pattern, so forth and so on, until a desired resolution of the interested area is obtained.

We consider the observed spatial signal as a noisy version of the wavelet coefficients of the original spatial information. Represent the sensing result of target space $V_k$ as:

$$y_{kj} = c_{kj} + \sigma_k \quad (23)$$

where $y_{kj}$ are the sensed wavelet coefficients, k denotes the decomposition level and j is the index of the coefficient at this level, $c_{kj}$ is the coefficients of the scaling function, and $\sigma_k$ is the current sensing noise. Note that $d_{kj}$ as the coefficient of the wavelet function corresponding to $c_{kj}$ is not used here.

Typically, only sparse targets are presented in the detected area. Therefore, most of the coefficients in a noiseless wavelet transform are effectively zero. When noise exists, a small magnitude sensing coefficient corresponds to pure noise. Consequently, they may be set to zero, and further sensing to this area is unnecessary. We propose to use thresholding to determine whether the area corresponding to the sensed coefficient needs further detailed sensing.

Since different level sensing results will have a different SNR, the threshold for a certain transform level, denoted by $\Lambda(k)$, should vary. It is a function of transform level k and the index j, but usually it only depends on k, i.e. $\Lambda = \Lambda(k)$.

$$\delta_\Lambda^H(c_{kj}) = \begin{cases} 0, & \text{if } |c_{kj}| \leq \Lambda(k) \\ c_{kj}, & \text{if } |c_{kj}| > \Lambda(k) \end{cases} \quad (24)$$

and $$\delta_\Lambda^H(c_{kj}) = \begin{cases} 0, & \text{if } |c_{kj}| \leq \Lambda(k) \\ c_{kj} - \Lambda(k), & \text{if } c_{kj} > \Lambda(k) \\ c_{kj} + \Lambda(k), & \text{if } c_{kj} < -\Lambda(k) \end{cases} \quad (25)$$

where $\Lambda(k)$ can generally be a function of k. The hard thresholding is simply wavelet thresholding, and the soft thresholding is referred to as wavelet shrinkage, since the amplitude of the coefficients is shrinked towards zeros. Similar study on image wavelet denoising has been extensively deployed in image processing, and other existing shrink methods such as sureshrink [32] and bayesshrink [33] can also be applied here. Without loss of generality, the soft thresholding is used in the simulation. To determine the threshold, we need to measure the noise level 6. One popular estimation method in wavelet denoising is proposed by Donoho and Johnstone [34]. In the radar application, the noise information can be measured from nearby Doppler and/or angle bins [35]. In the remaining part of this paper, for convenience it is assumed that $\sigma$ is given.

C. Transform Sensing for Angle Estimation

Consider a radar system with $M_t$ transmitters, and $M_r$ receivers. $x_m$ denotes the transmission signal by the mth transmitter element, and $\theta$ is the looking angle. For a target, the received signal in the looking angle $\theta$ can be expressed as:

$$y(\theta) = \sum_{m=1}^{M_t} e^{-J2\pi f_c t_m(\theta)} x_m. \quad (26)$$

The propagation delay from all the transmitters to the target in angle $\theta$ can be described by the vector:

$$a(\theta) = [e^{j2\pi f_c \tau_1(\theta)}, e^{j2\pi f_c \tau_2(\theta)}, \ldots e^{j2\pi f_c \tau_{Mt}(\theta)}]^T. \quad (27)$$

Eq. (26) is equivalent to $$y(\theta) = a^*(\theta)x \quad (28)$$

where $(\bullet)^*$ denotes the conjugate transpose, and x is the transmission signal of each transmitter, i.e.

$$x = [x_1, x_2, \ldots, x_n]^T, \quad (29)$$

and the dimension of x is T by $M_t$, where T is the duration of the transmission signal, and $M_t$ is the number of transmitter elements.

The propagation delays from the target to receivers can be described by the vector:

$$b(\theta) = [e^{j2\pi f_c \tau_1(\theta)}, e^{j2\pi f_c \tau_2(\theta)}, \ldots e^{j2\pi f_c \tau_{Mt}(\theta)}]^T. \quad (30)$$

Let $z_m$ represent the received signal by the mth receiver, the received signal can be represented as $$z = [z_1, z_2, \ldots, z_m]^T = \sum_k^K b^c y(\theta) \beta_k + N. \quad (31)$$

where $(\bullet)^c$ is the complex conjugate, N is the noise, k represents the number of targets, and $\beta_k$ denotes the target's RCS. The differences between transform sensing and other relevant techniques are discussed below.

(1) Gain: For the phased array, x attempts to match with a when the illumination angle $\theta_0 = 0$, i.e. the phased array generates the maximum gain in this angle:

$$y(\theta_0) = M_t. \quad (32)$$

Here we assume that the target is in angle $\theta$, and $\theta_0$ is the illuminate angle by the transmitter.

For the MIMO radar, each transmitter attempts to generate orthogonal waveform [3] to decouple with each other, and each angle receives independent signals from each transmitter, i.e. no gain in any direction:

$$y(\theta_0) = 1. \quad (33)$$

The MIMO radar can use conventional beamforming in post processing to separate objects. To separate more objects, compressive sensing and other super resolution angle finding techniques, such as minimum variance distortionless response (MVDR) and multiple signal classification (MUSIC) [36], can be further applied. However, they share the same gain with the MIMO radar.

Transform sensing shapes different resolution beams in different stage, and its gain depends on how many looking angles there are at the current sensing level, $$y(\theta) = M/2^K. \quad (34)$$

2) Sensing Efficiency: To compare the sensing efficiencies among different techniques, we assumed that there is a single target in the scene.

The phased array scans the angles sequentially. It will take $M_t$ scans to complete the sensing. Assume that the target is randomly placed. In average, the phased array needs $M_t/2$ scans to detect the target.

The MIO radar (and compressive sensing or other super resolution techniques) will scan all the angles simultaneously, and the object's angle can be found in 1 scan. For transform sensing, if the scan allows the widest beam, each scan can eliminate half of the angles where the object is not present. It will take log $2M_t$ scans to detect the target. On the other hand, the required number of sensing using compressed sensing is $kn^\alpha$[22], where k=1 for a single target, n=$M_t$, and $\alpha$ is a constant.

3) Computational Complexity: The phased array scans one angle each time, and there is no further calculation required in the signal processing. However, due to the same placement of transmitter and receiver, i.e. $b(\theta)=a(\theta)$, the angular resolution is limited.

For conventional beamforming, further calculation is required for generating beams in post processing. The typical coherent processing applies a basic matrix multiplication:

$$\beta = A^H z. \quad (35)$$

where A corresponds to the processing matrix in angle finding. It is typically a Fourier transform matrix, and needs $M_r \times M_r$ matrix multiplications for calculation.

The MIMO radar using conventional beamforming can further separate different transmitters for a higher resolution, and it needs $M_r M_t \times M_r M_t$ matrix multiplications.

Other super resolution angle finding techniques such as MVDR and MUSIC beamformer attempt to solve regularized inverse matrix or eigen decomposition of the $M_r M_t \times M_r M_t$ matrix, which has a higher calculation complexity than conventional beam forming.

Compressive sensing solves the equivalent $l_1$-norm when the targets are sparse:

$$\min\|\beta\|_1 \text{ subject to } \left\| z - \sum_{k}^{K} b^c y(\theta) \beta_k \right\| \leq \varepsilon. \quad (36)$$

The $l_1$-norm calculation needs more calculation than the other super resolution angle finding techniques.

For transform sensing, only $M_r \times M_r$ matrix multiplications are needed for each level's signal processing. Assuming that K level sensing is needed, it requires K times $M_r \times M_r$ matrix multiplications to complete the calculation.

In summary, the advantage of the transform sensing mechanism includes the following:

a) Adaptive to Gain Requirement. As shown in Eq. (34), transform sensing's gain is adaptable to different situations. It is between phased array and MIMO radars. As we discussed earlier in this section, when wavelet transform is applied, the widest scaling beam pattern can be selected based on the gain requirement. The wider the beam pattern is allowed, the more wavelet transform iterations can be applied, which means that we can start to sense the image in a much narrower low spatial-frequency band. The narrower low spatial-frequency band has less coefficients with higher probability of being effective. It leads to more efficient sensing. On the other hand, when the highest gain is required, transform sensing is identical to sequential scanning. That is, sequential scanning is the lower bound of the sensing performance in terms of the duration of the sensing time.

High Sensing Efficiency. The total number of the sensing basis functions is equal to $M_t$, which is also the maximum number of scans by sequential sensing using the traditional sequential scanning method. Transform sensing can use only $M_t/2^k$ scans to obtain a rough sensing result. The remaining $M_t(1-\frac{1}{2}^k)$ sensing patterns will be deployed based on the rough sensing result. Because there are many null coefficients in the wavelet transform, using only part of the remaining sensing patterns can still guarantee the highest resolution.

c) High Computational Efficiency. Using inverse wavelet transform to recover the image can rely on addition/subtraction with upsample/downsample operations. The implementation of the inverse wavelet transform takes only $O(M_r)$ complexity in cases.

e) Smooth Detection Result. Recall that wavelet transform applied to images will generate a large number of null coefficients. Abandoning these null coefficients do not impact the image quality. When noise exists, it generates only small magnitude coefficients. Abandoning them will improve the SNR of the sensing result.

Reliable Recovering Algorithm. Wavelet transform and wavelet inverse transform are of linear operations. As long as we can obtain part of the transform coefficients, we can recover the scene to certain extent. This is different from compressive sensing using an optimization algorithm to solve the coefficients, which are sometimes unsolvable or far from the ground truth.

V. SIMULATION AND EXPERIMENT

In this section, we present the simulation and experiment results. The first simulation shows that the transform sensing beam patterns are shaped in the space, and the integration of patterns for a single target detection. In the experiment, a transform sensing pattern is realized by a real phased array radar system. The second simulation compares transform sensing with other sensing techniques.

A. Sensing Pattern Simulation

In the simulation below, the radar system is working on 2 GHz frequency. It has 16 transmitter elements with element spacing $2\lambda$, and 4 receiver elements with element spacing $\lambda$.

Assume that the radar system is shaping Haar wavelets as its beam pattern for sensing the environment. We further assume that the widest beam pattern has four spatial points. Consequently, the scaling function is $f_{\varphi 2}(n)=[1,1,1,1]$ and the wavelet functions are $f_{\psi 2}(n)=[1,1,-1,-1]$, and $f_{\psi 2}(n)=[1,-1]$ respectively.

FIGS. 8A-8C shows the shaped scaling function $f_{\psi 2}(n)$ in the space. Because the transmit array will generate grating lobes due to its element spacing greater than $\lambda/2$, multiple identical scaling functions are shown in each sensing pattern of FIG. 8A. Because there are only 4 receiver array elements with element spacing $\lambda/2$, the receiver beam pattern is wide but without grating lobes. When the radar system senses the environment using both the transmitter and receiver arrays, the radar can generate different 2-way patterns corresponding to the wavelets. FIG. 8C further shows that several scaling function patterns can be deployed in the interested area. Note that at each time, the system can only generate one 2-way pattern, i.e. combining one selected transmitter and receiver pattern from FIG. 8A and FIG. 8B.

Figure 9A:
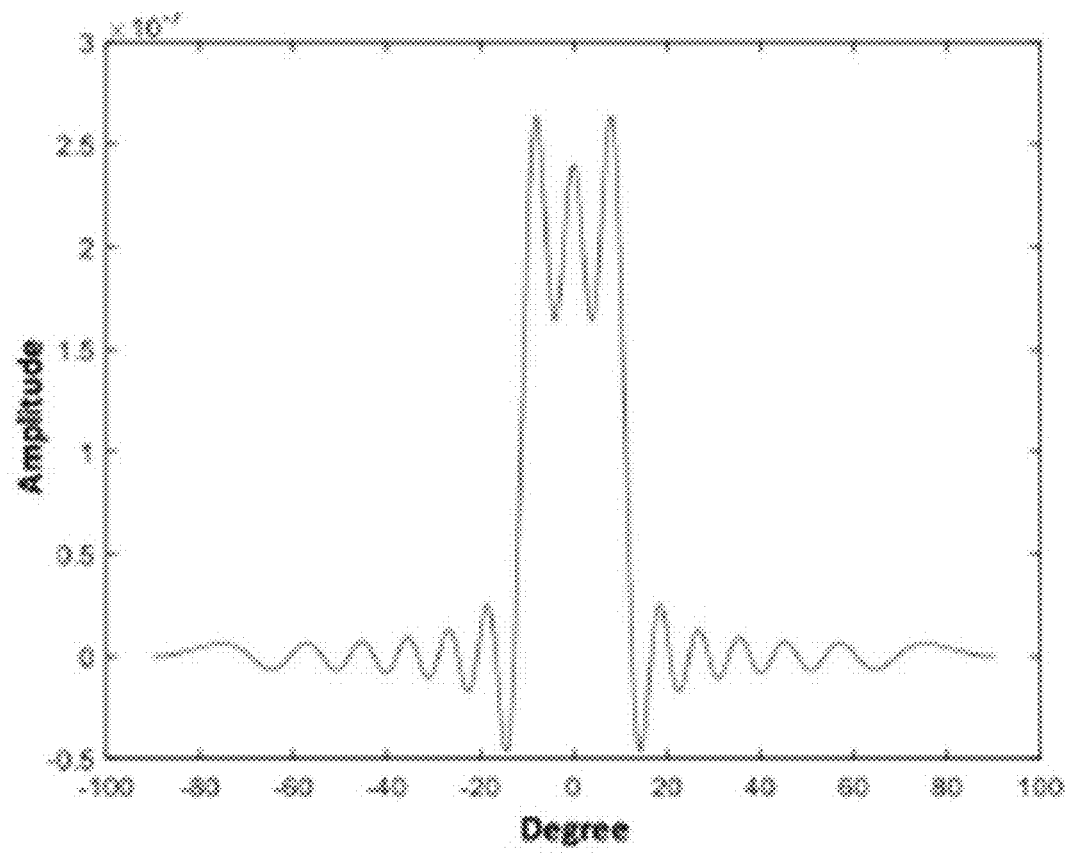
Figure 9B:
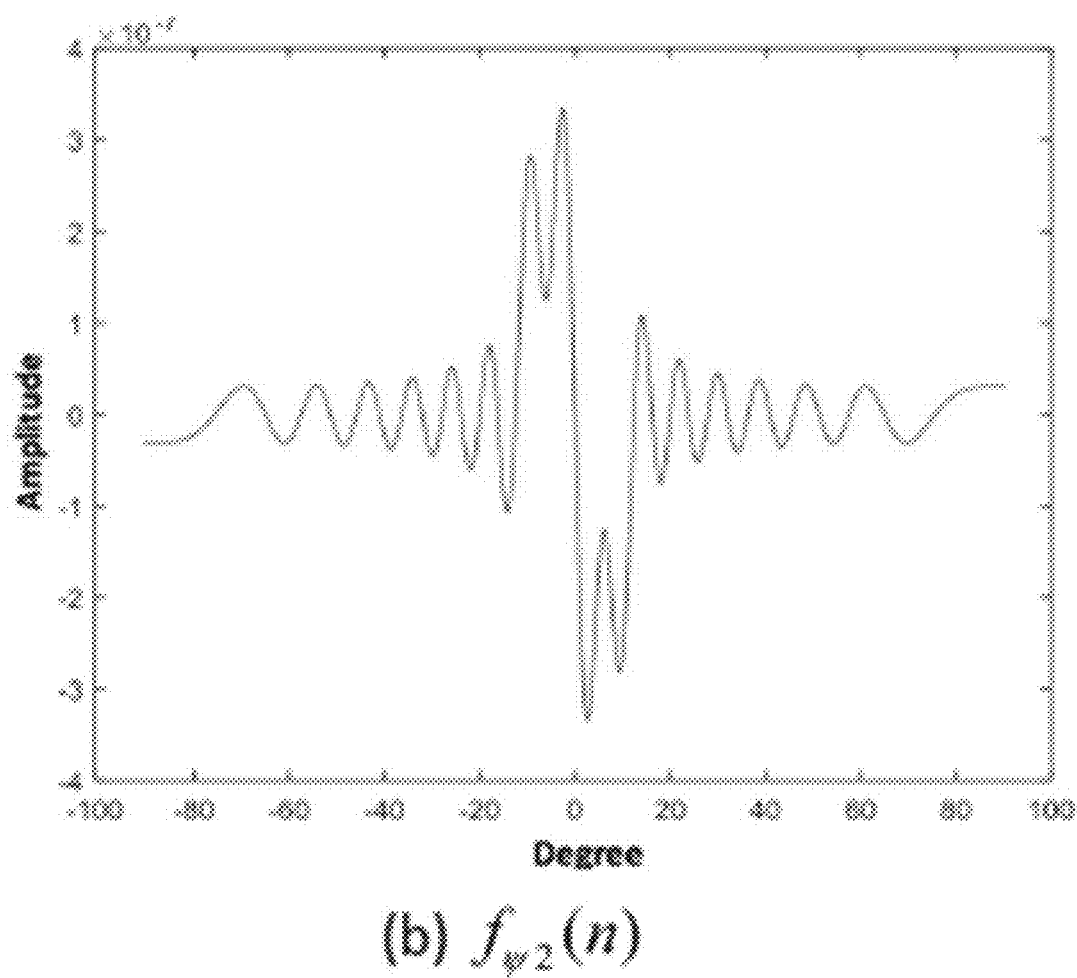
Figure 9C:
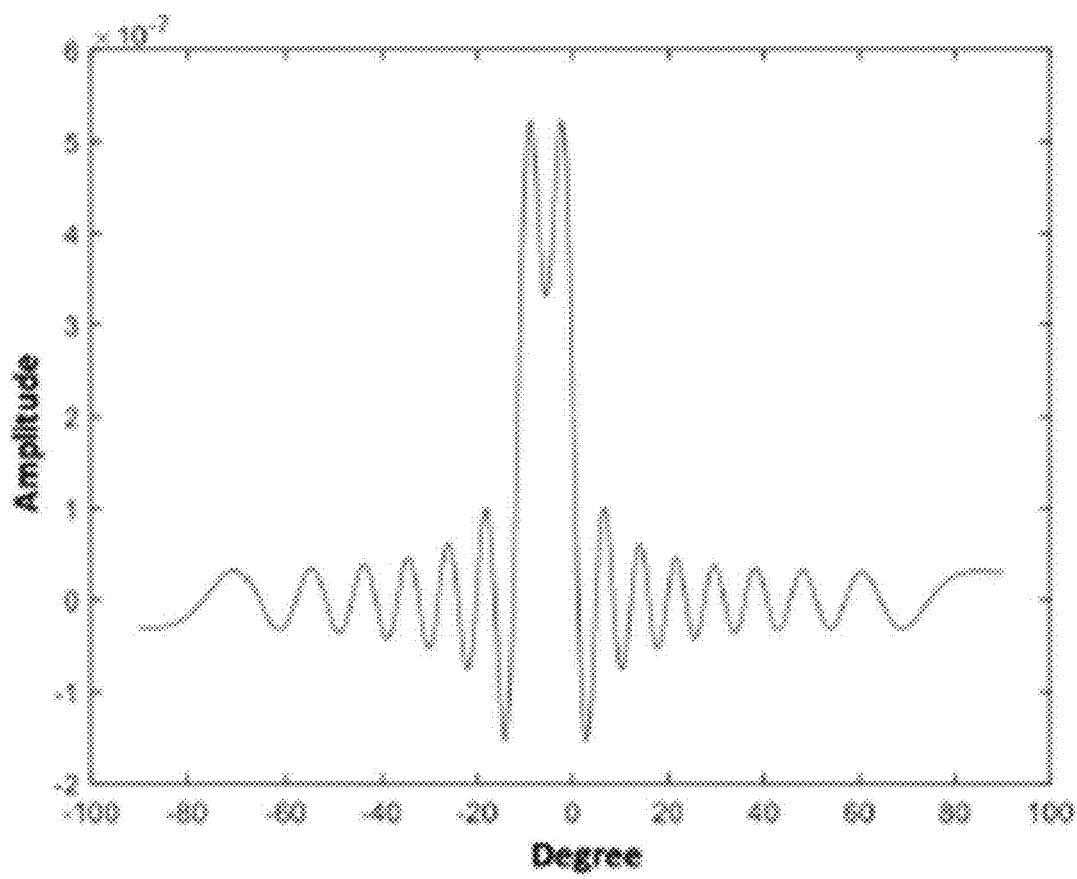
Figure 9D:
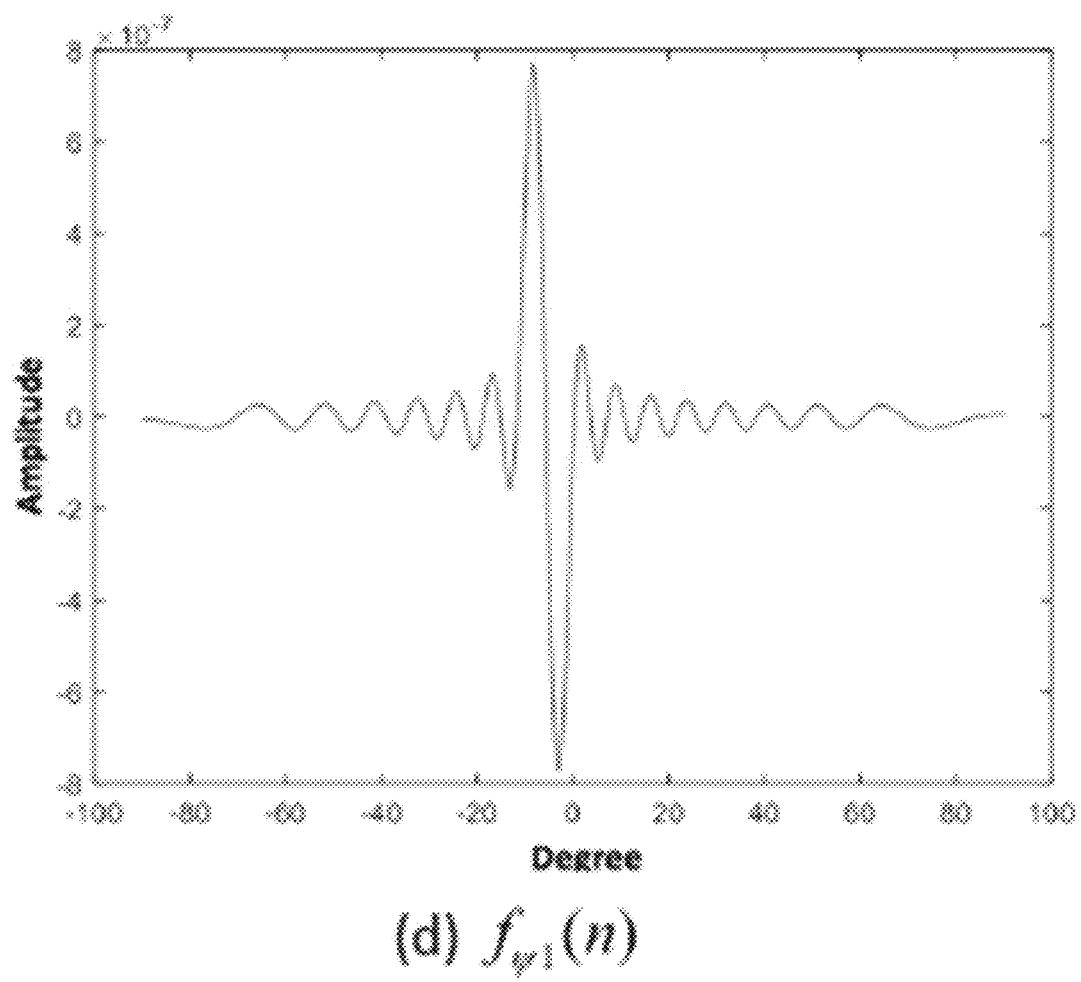
Figure 9E:
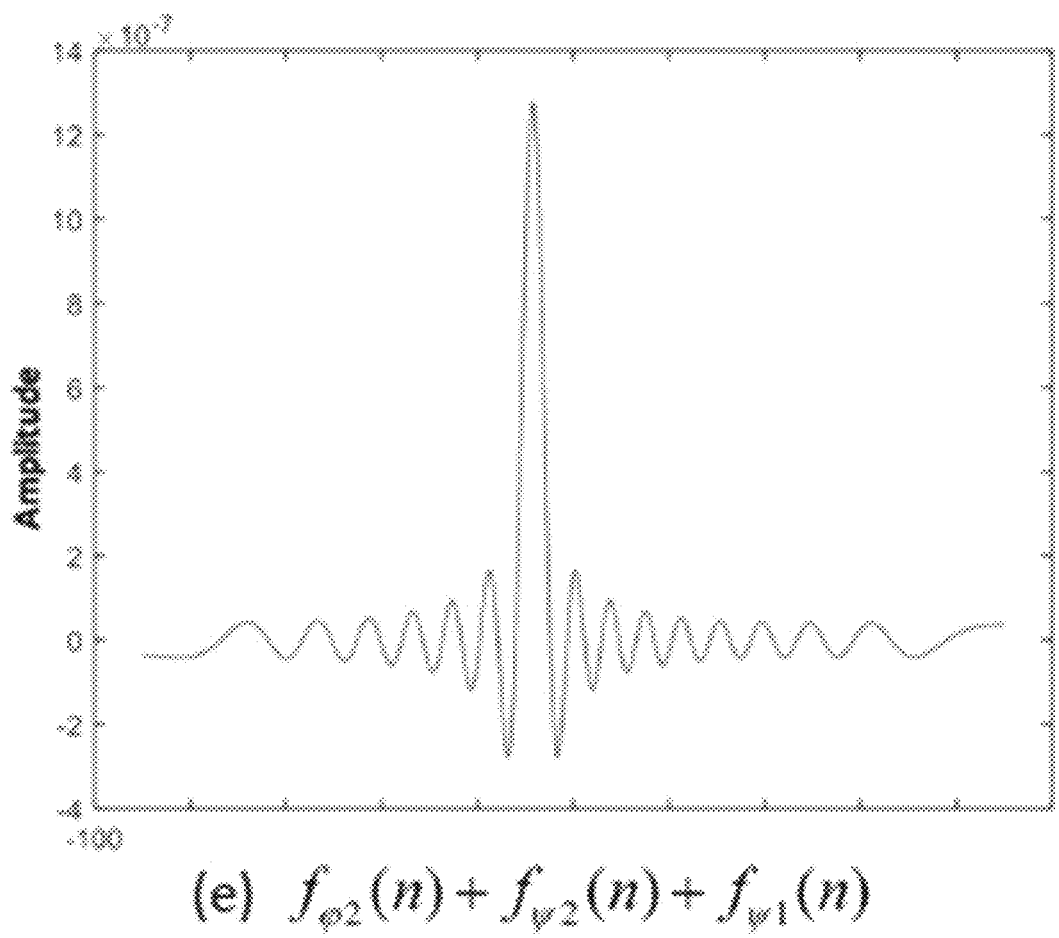

A set of Haar wavelet $f_{\varphi 2}(n), f_{\psi 2}(n)$ and $f_{\psi 1}(n)$ beam patterns are realized by combining the transmitter and receiver array patterns and shown in FIGS. 9A, 9B, and 9D, respectively. As we discussed in the previous section, $f_{\varphi 0}(n)$ can be generated after integrating $f_{\varphi 2}(n)$ and $f_{\psi 2}(n)$ as shown in FIG. 9C. Similarly, we can further obtain the $f_{\varphi 2}(n)$ pattern by integrating $f_{\varphi 1}(n)$ into $f_{\psi 1}(n)$ (FIG. 9E). This simulation shows that it is feasible to generate different sensing patterns based on wavelets, and integrating sensing patterns can gradually achieve higher resolutions.

The processing flow of transform sensing is shown in FIG. 10. We further investigate the efficiency of the purposed beam patterns in searching for a single target in FIG. 11. Assume that there is a target with a unit amplitude in the azimuth angle 2.8 degree, and the SNR is 20 dB. The first four sensing patterns as shown in FIG. 8C can fast determine whether a target is presented in the wide beam area. These patterns are scaling functions $\varphi_k[n]$. Their iteration (or decomposition level) is 2, and they are having different time shifts. Using these four sensing patterns, the sensing result will be four discrete wavelet transform coefficients $c_{kj}$:

$$[c21, c22, c23, c24] = [1.8648, 0.0097, 0.0069, 0.0489], \quad (37)$$

where k is the iteration (or decomposition level) of the scaling function, and j represents the index of the coefficient at this level. Because the SNR is supposed to be 20 dB. The largest coefficient $|c_{21}|$ divided by the noise level gives us the soft threshold:

$$\Lambda(2) = \text{db2mag}(\text{mag2db}(|c_{21}|) - 20) = 0.1865 \quad (38)$$

where "db2mag" means the function to change the signal magnitude from the dB scale to the linear scale, and "mag2db" vice versa. Thus, further sensing on the sensing pattern area c21 is necessary. The next sensing pattern of FIG. 9B is deployed. It is a wavelet function $\psi k[n]$, with the same iteration, and time shifts as the scaling sensing pattern corresponding to c21. The sensing result, is a wavelet coefficient:

$$d_{21} = 1.7945. \quad (39)$$

Since the integration between the scaling function coefficient $c_{kj}$ and the wavelet function coefficient $d_{kj}$ generate 1-level detailed wavelet coefficients (Section II-C), we obtain:

$$c_{11} = c_{21} + d_{21} - \Lambda(2)) = 3.4728, \quad (40)$$

$$c_{12} = c_{21} + d_{21} - \Lambda(2)) = 0.2568, \quad (41)$$

The integration between the two sensing patterns in this stage improves the SNR by 3 dB. The largest coefficient $|c_{11}|$ divided by the noise level gives us the soft threshold:

$$\Lambda(1) = \text{db2mag}(\text{mag2db}(|c_{11}| - 23)) = 0.4905.$$

The target should be present in area c11, and the corresponding scaling function is 1-level detailed scaling function. Therefore, we can further sense the area using the pattern as shown in FIG. 9D, which is 1-level detailed wavelet function, and obtain:

$$d\_\{11\} = 3.5521 \quad (43)$$

Thus, $$c_{01} = c_{11} + d_{11} - \Lambda(1)) = 6.5343, \quad (44)$$

$$c_{02} = c_{11} + d_{11} - \Lambda(1)) = 0.4112. \quad (45)$$

Because we have integrated one more sensing pattern in this stage, the SNR is improved by 3 dB again. The largest coefficient $|c_{01}|$ divided by the noise level gives us the soft threshold:

$$\Lambda(0) = \text{db2mag}(\text{mag2db}(|c_{01}| - 26)) = 1.3038. \quad (46)$$

Note that $c_{01}$ corresponds to 2-level detailed scaling function, and the location of the target should be where the corresponding scaling function is. Comparing with sequential scanning, the 2-level detailed scaling function is deployed one by one. In this simulation, we are assuming $4^3 = 64$ pixels, and it will use 64 scans to cover the whole area with detailed information on every pixel. In comparison, transform sensing only uses 6 scans to discover the exact location of the single target.

B. Experiment

In this subsection, we demonstrate experimentally that by using the algorithm presented in Section III, a desired sensing pattern can be generated by a phased array radar. The phased array radar we used has 256 elements, 16 in each of the x and y directions, respectively. The radar system also has a horn probe which can detect the radiation pattern in the near-field. The probe is attached to a robotic arm which can move in both horizontal and vertical directions with a resolution of 33 by 33 samples. Furthermore, the near-field pattern can be converted into far-field by a software. As a result, the radar waveform pattern in the space can be predicted which brings a significance convenience to our study. That is, the data obtained in a compact-range laboratory space can generate the far-field pattern by using the computer which records the data. FIG. 12 shows the use of the array radar for generating a single-peak beam pattern in the middle (zero degree for both elevation and azimuth directions). One can clearly see in the figure a spot of orange shows the maximum strength of the waveform in the center. Side-lobes of the waveform are shown in lighter orange. The azimuth display of the radiation pattern is shown in FIG. 13.

In the following we present the result about how such an array radar can be used to generate a desired pattern. For simplicity, our study is focused on the x (azimuth) direction. We attempt to generate a [ . . . , −1, −1, 1, −1, −1, 1, −1, . . . ] sensing pattern. That is, a Haar type wavelet pattern.

The "1" means high strength in radiation while "−1" means very low strength, equivalent to "zero" in the Haar wavelet. We use two methods for generating the desired patterns. The first one is the sequential method, by which the 16 elements are divided into two groups. The first group is responsible generating the left [ . . . , −1, 1, −1] sub-pattern, and the second group is responsible for the right [−1, 1, −1, . . . ] sub-pattern. In combination the two will generate the desired pattern. In the second approach all the 16 elements work together to generate the desired [ . . . , −1, −1, 1, −1, −1, 1, −1, . . . ] pattern. Both of them use the same algorithm as discussed in Section III, except sequentially twice in the first approach and concurrently once in the second approach. Both the sequential and concurrent approaches were used in our experiments.

1) Sequential Approach: In the first experiment we use the sequential approach. In this approach, the elements are divided into two groups and each group is responsible for one sub-pattern. We aim to generate two "1"s at −15 and +15 degrees in the azimuth direction, respectively. Therefore, the first eight are for the −15 degree sub-pattern and the second group for the +15 degree sub-pattern. The result of the test is shown in FIG. 14. From the figure, one can see two sensing strengths separately by 30 degrees in the far-field radiation pattern.

The azimuth display of the radiation strength in the far-field is shown in FIG. 15, again with two peak strengths in the azimuth direction.

From the above two figures one can see that the two beams of strength are formed in the azimuth direction instead of one usually by the conventional phased array radars. This result has proven that a sensing pattern can be generated by the transform sensing mechanism, using an element-programmable phased array radar.

2) The Concurrent Method: In the concurrent method, all the 16 elements work together for the transform sensing algorithm as presented in Section III. The overall pattern is generated once by all the 16 elements together. In this experiment, we set the two strength angles at −7 and 4 degrees, respectively. The overall pattern of [ . . . , −1, −1, 1, −1, −1 1, −1, . . . ] remains the same.

FIG. 16 shows the experimental result, which demonstrates two strengths in −7 and 4 degrees.

The azimuth display of the radiation strength in the far-field of the concurrent approach is shown in FIG. 17.

We consider that the key of the proposed transform sensing mechanism is to generate the desired sensing pattern. Such a pattern will lead to practically transformation to the entire target space. Once the pattern becomes feasible, the received signals can be added together to generate the coefficient of a predesigned transformation. The experimental results prove that the transform sensing mechanism is feasible in reality by using the phased array radar.

C. Transform Sensing Compared with Other Techniques

To demonstrate the array gain and the sensing efficiency of transform sensing, the proposed method is applied to radar simulation data and compared with the phased array and MIMO radars using either conventional beamforming or compressed sensing.

The simulation data are for long range radar working on X-band (10 GHz), i.e. $\lambda=3$ cm. The array has $M_t=16$ transmitters and $M_r=16$ receivers. For the phased array, both the transmitters and receivers share the same placement, i.e. inter-element spacing $\lambda/2$. For the MIMO radar (apply either conventional beamforming or compressive sensing), the transmitters are spaced by 8K, while the receivers are spaced by $\lambda/2$. Two objects are placed at [−21.2°,61.5° ], with Radar Cross Section (RCS) equal to [10 dB, 30 dB]. In the simulation, the SNR of each transceiver pair is −20 dB. The angle measurement grid is [−90°:0.18°: 90° ]. The 0.18° grid spacing is considered sufficient to avoid basis mismatch for compressive sensing. Note that in the simulation, we assume that ideal orthogonal waveforms can be employed by the MIMO radar.

Figure 18B:
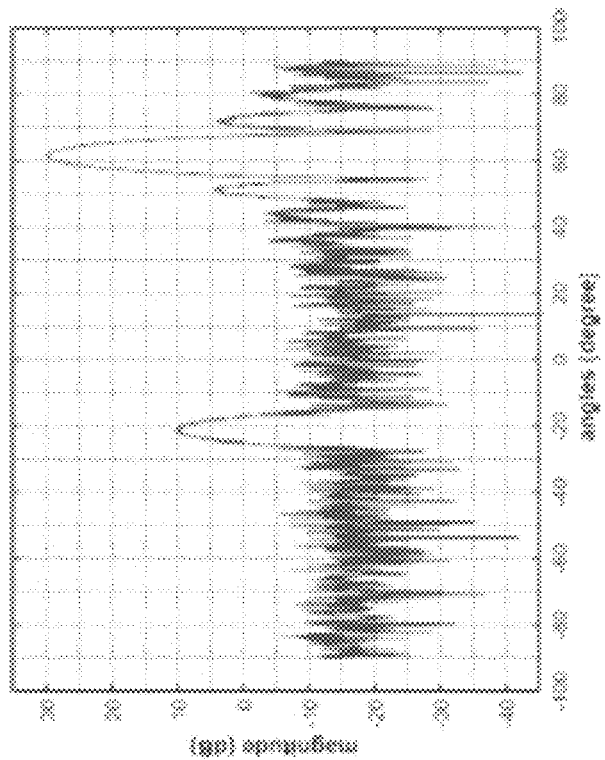
Figure 18A:
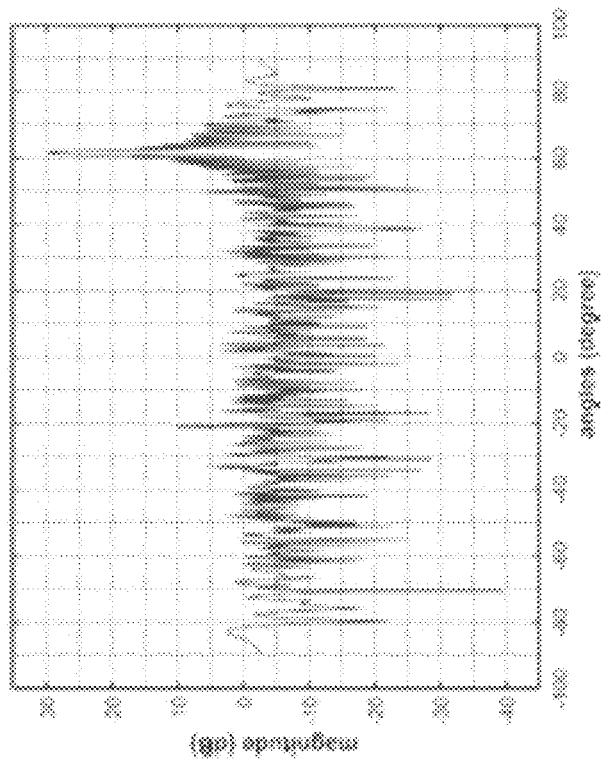
Figure 18D:
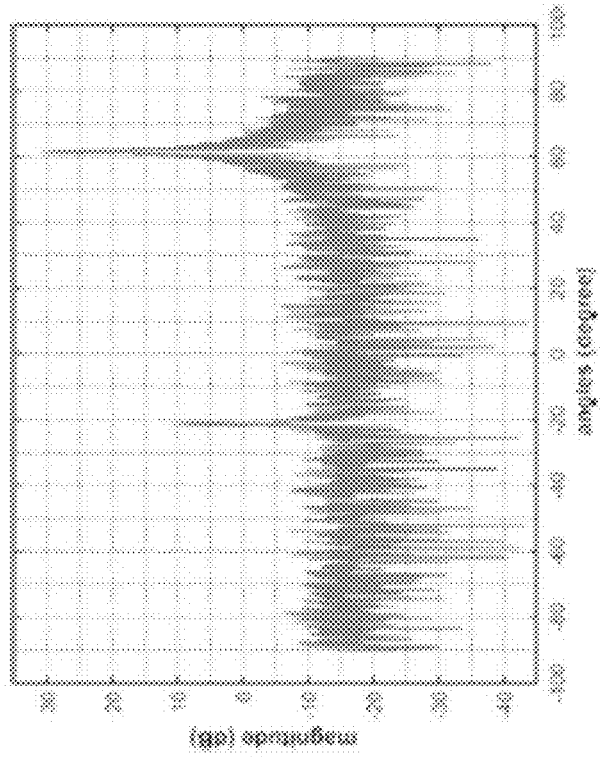
Figure 18C:
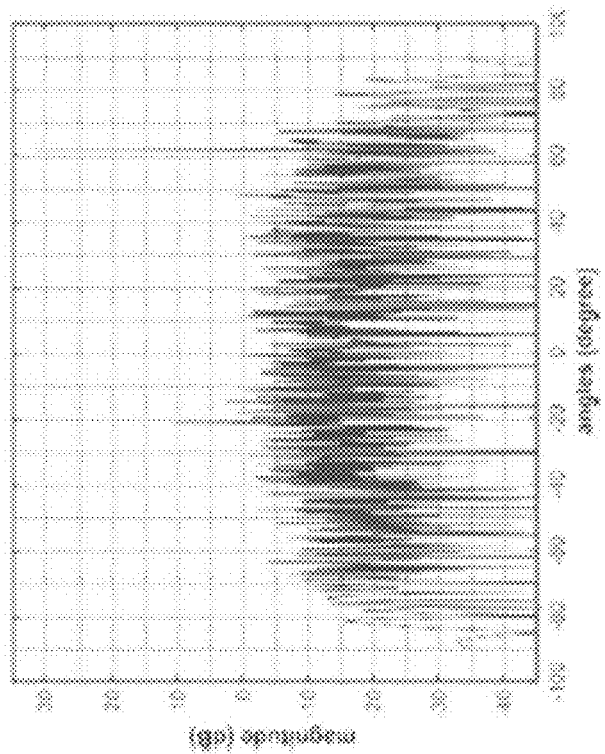

1) Sensing Result Comparison: We compared the final result of the four different techniques in detecting two objects in FIGS. 18A-18D. As shown in FIG. 18A, the MIMO technique loses around 10 dB transmission gain, and achieves better resolution than the traditional phased array of FIG. 18B. The transform sensing of FIG. 18D achieves the same resolution as MIMO (FIG. 18A) without losing transmission gain. Though compressed sensing (FIG. 18C) can further increase the resolution over the conventional beam forming, the noise floor is still higher than the traditional phased array. Comparing with the MIMO radar (FIG. 18C), transform sensing (FIG. 18D) can have as a high resolution as the MIMO radar, while its noise floor is kept low.

Figure 19A:
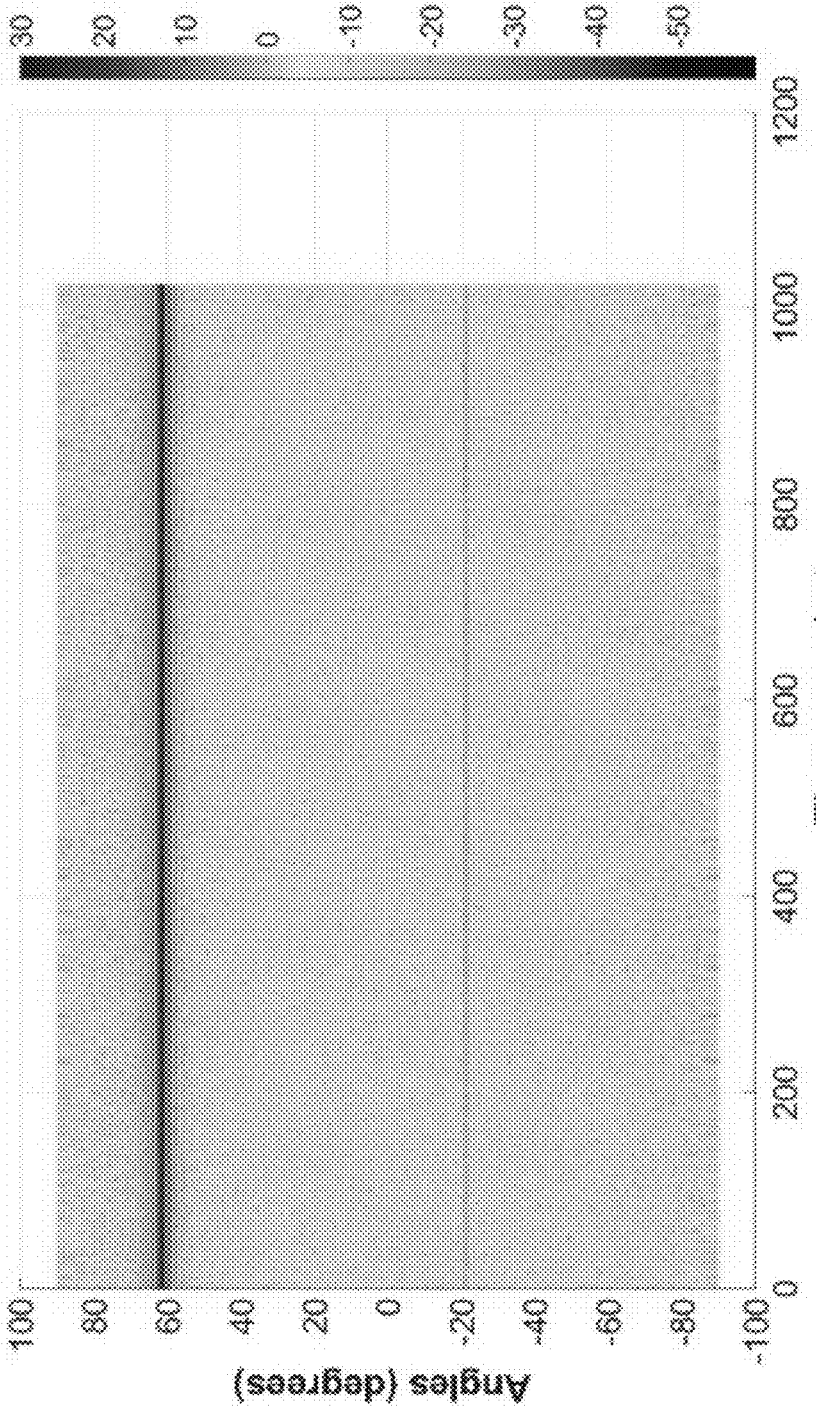
Figure 19B:
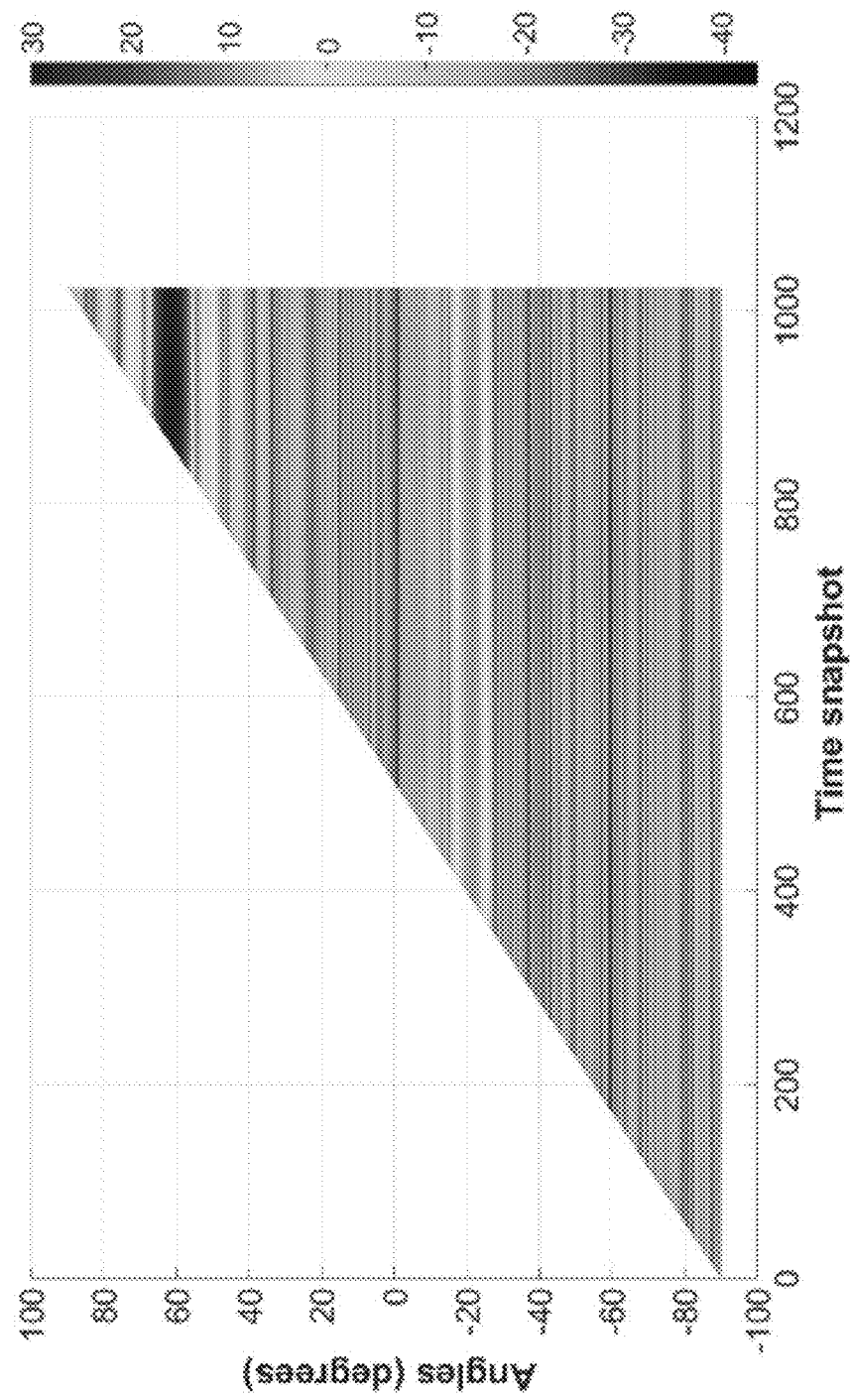
Figure 19C:
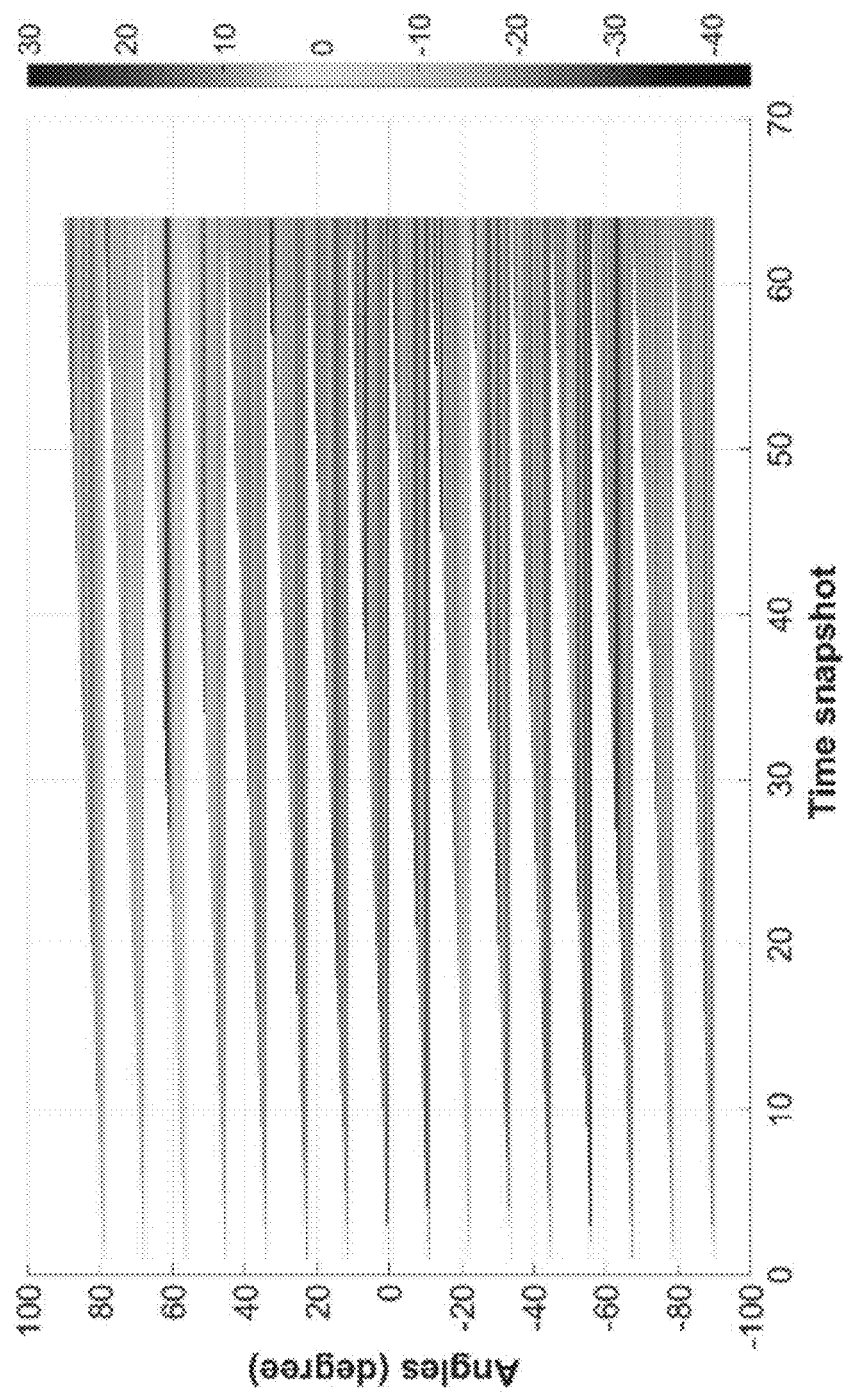
Figure 19D:
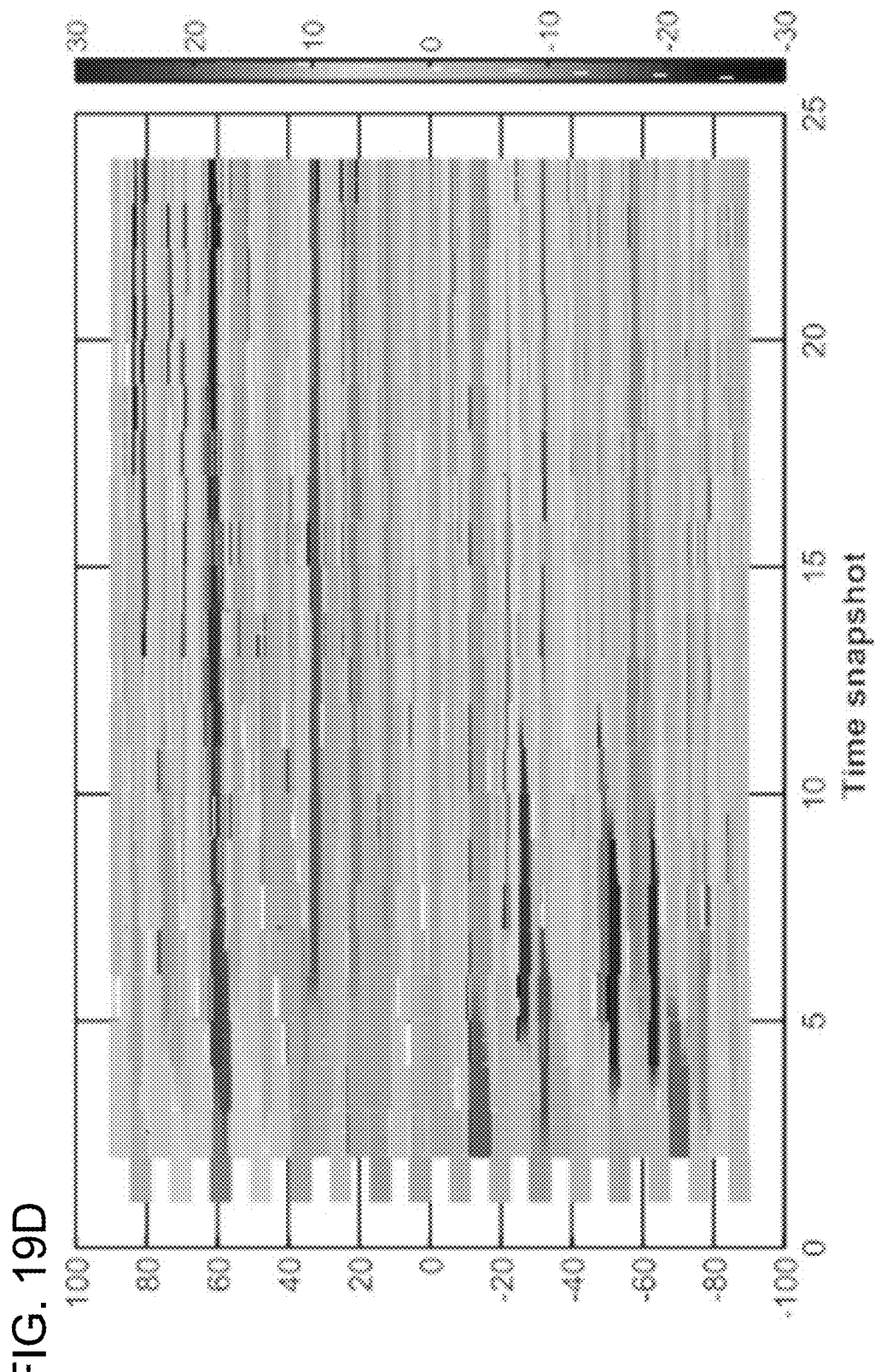
Figure 20:
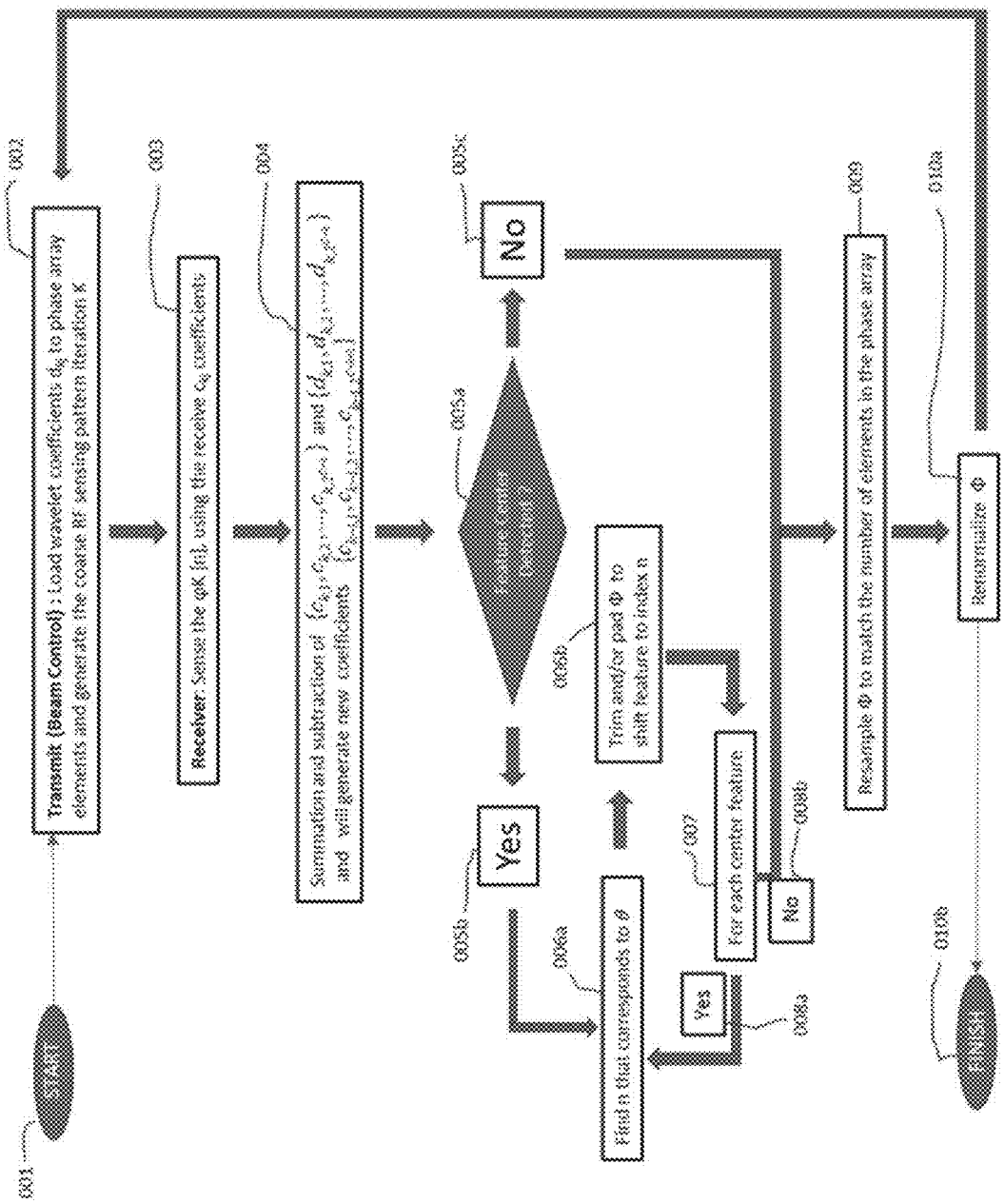

2) Sensing Efficiency Comparison: The sensing efficiency is compared. The same static targets are placed in 61.5 and −21.2 degrees. The simulation shows how different techniques generate the final result (FIG. 16) step by step. In FIGS. 19A-19D, the x coordinate is the time snapshot, i.e. the number of sensing times. To generate the 0.18° degree grid, the traditional phased array (FIG. 19A) focuses on only one angle. As sensing time elapses, the array scans the space from −90 to 90 degrees sequentially, and finishes the sensing after 1024 scans. That sensing process forms the triangle as shown in FIG. 19B. At 61.5 and −21.2 degrees relatively higher red and orange levels are demonstrated in FIGS. 19C-19D, which indicate where the two targets are. The MIMO radar can finish sensing in a single scan. Transform sensing is between the two. If the SNR is insufficient, it starts from the narrowest beam, and takes 64 scans to finish the sensing. If the SNR is sufficient (true in this simulation), the sensing starts from a wider beam, and takes 24 scans to finish the sensing.

IV. CONCLUSION

In this patent, we have presented a new feedback sensing mechanism based on wavelet coefficients, named transform sensing, for the phased array or the MIMO system to generate multiple beam patterns in the space. Taking the multi-resolution advantage in the spatial-frequency of the wavelets, transform sensing can generate multiple beam patterns using wavelet bases. Consequently, each sensing result is equivalent to a wavelet transform coefficient. Recall that there are a large number of null coefficients when applying wavelet transform to an image. The Transform sensing applied to phased array does not need to deploy all the wavelet sensing patterns to the space. It generates coarse to detailed patterns to sense a targeted area. The coarse sensing patterns (i.e. wide beam pattern) are firstly applied to cover a wide area using less sensing times. After thresholding the coarse sensing results, the radar system can automatically determine which new sensing pattern is necessary for the next detailed level scanning. In this way, the transform sensing radar system can eliminate redundant sensing, and thus improving sensing efficiency.

Simulations and experiments demonstrate how to generate the transmission patterns and obtain sensing result via the transform sensing mechanism. The results also demonstrate that transform sensing obtains high resolution samples on the target area, while spending less time on non-target areas. In this way, the sensing generates an ideal performance, which balances resolution and efficiency.

APPENDIX

Wavelets in Sensing

According to the wavelet theorem [27], we redefine the basic recursion equations that generate the scaling function $\varphi_k[m]$ and the wavelet function $\psi_k[m]$ in different iterations k as below:

$$\varphi_k[m]=h[m]\otimes\text{upsample}(\varphi_{k-1}[m],2), \quad (47)$$

$$\psi_k[m]=g[m]\otimes\text{upsample}(\varphi_{k-1}[m],2), \quad (48)$$

$$\text{where } g(m)=(-1)^m h(L-m-1), \quad (49)$$

"$\otimes$" is discrete convolution calculator, L the length of the wavelet generation coefficients h[m], and the calculation "upsample(x[m], 2)" means up-sampling the input signal x[m] 2 times by padding zeros. Usually, the iteration will start from the delta function, i.e. $\varphi 0[m]=\delta[m]$. Take the Haar wavelet for example. Its generation coefficients are h[m]=[1, 1]. Starting from $\varphi 0[m]=[1]$, we obtain $\varphi 1[m]=[1, 1]$ and $\psi 1[m]=[1, −1]$. One more iteration gives us $\varphi 2[m]=[1, 1, 1, 1]$ and $\psi 2[m]=[1, 1, −1, −1]$.

Assume that the spectra of h[m] and g[m] are H(w) and G(w), respectively. The recursion equation becomes as follows:

$$\varphi_k(w) = \left[\prod_{m=0}^{k-1} H(2^m w)\right]. \tag{50}$$

$$\psi_k(w) = \left[G(w)\prod_{m=1}^{k-1} H(2^m w)\right] \tag{51}$$

Because the wavelet generation coefficient h[m] is equivalent to a low pass filter coefficient, scaling function is a low frequency-band filter function while the wavelet function is the corresponding high frequency-band filter function. The different iteration time k generates scaling or wavelet functions in a different length. Due to the time frequency localized properties, ϕk[m] is twice as long as ϕk−1[m] in the time domain (or spatial domain), thus half bandwidth of ϕk−1[m] in the frequency domain (or spatial frequency domain).

One interesting property of wavelets is multiresolution. Assume that in the space there are M discrete pixels, and M happens to be the power of 2, i.e. M=$2^C$, where C is a constant corresponding to the size of sensed area. Let the space of $Z^M$ be Vk=Span{ϕk[m], ϕk[m−1·$2^k$], ϕk[m−2·$2^k$], ..., ϕk[m−$2^{K-k}$·$2^k$]}, k∈[0, 1, 2, ..., K]. The signal x(m) in the vector space Vk can be written as:

$$x(m) = \sum_J c_{kj} \varphi_{kj}(m) \cdot \text{for any } x(m) \in V_k. \tag{52}$$

Where ϕkj (m) is one scaling function inside Vk; and ranges from 1 to $2^{K-k}$. Note that it means that if the signal is scanned by ϕkj (m), the wavelet coefficient $c_{kj}$ will be obtained. The size of the subspace $V_k$ can be increased by changing the scaling function to a short duration via decreased iteration times k. Consequently, the vector spaces $V_k$ spanned by different scaling functions form a nested spanned space: ... ∈Vk⊂Vk−1⊂Vk−2 ... ⊂V0=$Z^M$.

Similar to the definition of $V_k$, let $W_k$=Span{ψ$_k$[m], ψ$_k$[m−1·$2^k$], ψ$_k$[m−2·$2^k$] ..., ψ$_k$[m−$2^{K-k}$·$2^k$]} be another subset of $Z^M$. The signal x(n) can also be scanned by the wavelet function, and the wavelet coefficient d$_{kj}$ will be $$d_{kj} = <x(m) \cdot \psi_{kj}(m)> = \sum_n x(m)\psi_{kj}(m). \tag{54}$$

According to the wavelet theorem, $$V_{k-1}=V_k \oplus W_k, \tag{55}$$

where ⊕ represents the direct summation. It means that $c_{kj}$ can be obtained via the direct summation and subtraction of $c_{k-1,j}$ and $d_{k-1,j}$. Further, we can obtain:

$$V_0=V_k \oplus W_k \oplus W_{k-1} \oplus +W_{k-2}\beta \ldots \oplus W_1. \tag{56}$$

If $Z_M$ is seen as the space of spatial response of the sensed targets, we are proposing to generate different sensing pattern based on the set of basis functions to sense the environment. Different sensing bases may have different advantages. In this paper, we narrow down the selection of basis function set to wavelets. The advantage of wavelets is its multi-resolution property, which allows the sensing pattern to vary according to the previous sensing result.

The following references cited above are incorporated by reference:

[1] S. Darlington, "Pulse transmissions", U.S. Pat. No. 2,678,997, May 18, 1954.

[2] R. H. Barker, "Group synchronizing of binary digital sequences," Communication Theory, pp. 273-287, 1953.

[3] R. L. Frank, "Polyphase codes with good nonperiodic correlation properties," Information Theory, IEEE Transactions on, vol. 9, no. 1, pp. 43-45, 1963.

[4] R. Bonneau, "A wavelet packet basis optimization approach to radar waveform design," in Proc. IEEE International Symposium on Antennas and Propagation, 2001, pp. 814-816.

[5] J. Benedetto and J. Donatelli, "Ambiguity function and frame-theoretic properties of periodic zero-autocorrelation waveforms," Selected Topics in Signal Processing, IEEE Journal of, vol. 1, no. 1, pp. 6-16, 2007.

[6] J. P. Costas, "A study of a class of detection waveforms having nearly ideal range-Doppler ambiguity properties," Proceedings of the IEEE, vol. 72, no. 8, pp. 996-1008, 1984.

[7] F. J. Harris, "On the use of windows for harmonic analysis with the discrete Fourier transform," Proceedings of the IEEE, vol. 66, no. 1, pp. 51-83, 1978.

[8] S. Cao, Yuan F. Zheng, and R. L. Ewing, "Wavelet-based waveform for effective sidelobe suppression in radar signal," Aerospace and Electronic Systems, IEEE Transactions on, vol. 50, no. 1, pp. 265-284, 2014.

[9] S. Cao, Yuan F. Zheng, and R. L. Ewing, "A Wavelet Packet Based Radar Waveform for High Resolution in Range and Velocity Detection," Geoscience and Remote Sensing, IEEE Transactions on, vol. 53, no. 1, pp. 229-243, 2015, DOI: 10.1109/TGRS.2014.2321258.

[10] C. V. Jakowatz, D. E. Wahl, P. H. Eichel, D. C. Ghiglia, and P. A. Paul, Spotlight-mode synthetic aperture radar: a signal processing approach. Kluwer Academic Publishers, Norwell, Mass., USA, 1996.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
providing an array comprising a plurality of radar transmitter elements ($M_t$) and radar receiver elements ($M_r$) in a uniformly linear array, the transmitter elements separated by distance $D_t$ and the receiver elements separated by distance $D_r$;
forming a first radar beam pattern with a plurality of radar beams in parallel with the array of radar transmitters, the radar beam comprised of wavelets, the first radar beam pattern having an initial resolution;
transmitting the first radar beam pattern toward a space in a targeted area to sense the targeted area;
receiving a plurality of reflected radar image wavelets of the targeted area as a sensing result, wherein each sensing result comprises a plurality of wavelet transform coefficients;
the performing wavelet denoising to both shrink the wavelet transform coefficients from the received sensing result and determine a location of detailed sparse coefficients,
wherein the plurality of radar beams comprises a series of sensing patterns (functions $fk(m)$ where k=0, 1, 2, 3, etc.) that is applied to the space in the targeted area ($x(m)$) to obtain a single value coefficient ($X(k)$); and
determining a new radar beam pattern based on the sensing result; and
applying the new sensing pattern with a finer resolution (i.e. higher resolution) than a previous radar beam pattern.

2. The method of claim 1, further comprising employing wavelets as sensing patterns to sense the targeted area, wherein each sensing pattern $fk(m)$ is applied to the sensed area $x(m)$, the received signal is the summation of multiplying this sensing pattern to the sensed area $x(m)$, and each sensing result is obtained as a single coefficient $X(k)$.

3. The method of claim 2, further comprising iteratively sensing at least a first subset of the sensed targeted area with increasingly finer resolution wavelets.

4. The method of claim 3, further comprising iteratively sensing at least a second subset of the sensed targeted area with the initial resolution wavelets.

5. The method of claim 4, wherein the distance between every two adjacent receiver elements is $\lambda/2$, and the distance between every two adjacent transmitter elements is $M_r\lambda/2$.

* * * * *